US009674926B2

(12) United States Patent
Destine et al.

(10) Patent No.: US 9,674,926 B2
(45) Date of Patent: Jun. 6, 2017

(54) STREET LIGHTING CONTROL, METHOD, DEVICE AND SYSTEM

(71) Applicant: Universite De Liege, Angleur (BE)

(72) Inventors: Jacques Destine, Beaufays (BE); Guy Lejeune, Aachen (DE)

(73) Assignees: UNIVERSITE DE LIEGE, Angleur (BE); SMARTNODES SA, Angleur-Liege (BE)

( * ) Notice: Subject to any disclaimer, the term of this patent is extended or adjusted under 35 U.S.C. 154(b) by 0 days.

(21) Appl. No.: 14/439,884

(22) PCT Filed: Dec. 6, 2013

(86) PCT No.: PCT/EP2013/075868
§ 371 (c)(1),
(2) Date: Apr. 30, 2015

(87) PCT Pub. No.: WO2014/095433
PCT Pub. Date: Jun. 26, 2014

(65) Prior Publication Data
US 2015/0319825 A1 Nov. 5, 2015

(30) Foreign Application Priority Data
Dec. 20, 2012 (EP) .................................... 12198770

(51) Int. Cl.
H05B 41/36 (2006.01)
H05B 37/02 (2006.01)
H05B 33/08 (2006.01)

(52) U.S. Cl.
CPC ..... *H05B 37/0227* (2013.01); *H05B 33/0854* (2013.01); *H05B 37/0218* (2013.01);
(Continued)

(58) Field of Classification Search
CPC ............ H05B 37/0227; H05B 37/0218; H05B 33/0854; H05B 37/0245
(Continued)

(56) References Cited

U.S. PATENT DOCUMENTS 8,941,330 B2 * 1/2015 Ng ................................ 315/307
2010/0001652 A1 * 1/2010 Damsleth ........... H05B 37/0227
315/149
(Continued)

FOREIGN PATENT DOCUMENTS

| CA | 2 692 187 A1 | 1/2009 |
| GB | 2 444 734 A | 6/2008 |
| WO | 2011/055259 A1 | 5/2011 |

OTHER PUBLICATIONS

Horvat G et al., "Using radio irregularity for vehicle detection in adaptive roadway lighting", MIPRO, 2012 Proceedings of the 35th International Convention, IEEE—ISBN 978-1-4673-2577-6 ; ISBN 1-4673-2577-5, pp. 748-753, May 21, 2012.

(Continued)

*Primary Examiner* — Douglas W Owens
*Assistant Examiner* — Wei Chan
(74) *Attorney, Agent, or Firm* — Jacobson Holman, PLLC.

(57) ABSTRACT

Method for controlling street lighting over a plurality of interconnected road segments, in which a road class is dynamically assigned to each road segment on the basis of, at least, stored road type data associated to each road segment and traffic parameters determined for each road segment for a current time period. At least a corresponding maximum lighting level is associated to each road class. In this method, signals comprising speed and direction of travel data of road users, and an identification of the road user are propagated through series of adjacent road segments starting from each road user's road segment, and a new lighting level equal to said maximum lighting level is set at each road segment whose distance to the road user's road segment is not greater than a first distance. A control device for implementing the above method is also disclosed.

10 Claims, 17 Drawing Sheets

(52) U.S. Cl.
CPC ..... *H05B 37/0245* (2013.01); *H05B 37/0281* (2013.01); *Y02B 20/42* (2013.01)

(58) Field of Classification Search
USPC .......... 315/32, 362, 307, 149, 312, 150, 294
See application file for complete search history.

(56) References Cited

U.S. PATENT DOCUMENTS

| | | | |
|---|---|---|---|
| 2010/0029268 A1* | 2/2010 | Myer | F21S 2/00 455/426.1 |
| 2010/0201267 A1* | 8/2010 | Bourquin | H05B 37/0245 315/32 |
| 2012/0038281 A1* | 2/2012 | Verfuerth | H05B 37/0272 315/152 |
| 2012/0038490 A1* | 2/2012 | Verfuerth | H05B 37/0272 340/910 |
| 2012/0206051 A1* | 8/2012 | Nieuwlands | H05B 37/0227 315/153 |
| 2012/0306382 A1 | 12/2012 | Maxik et al. | |

OTHER PUBLICATIONS

International Energy Communication Technical Report CIE 115:2010, "Lighting of Roads for Motor and Pedestrian Traffic", ISBN 978 3 901906 86 2.
European Standard CEN 13201-2:2003, "Road lighting—Part 2: Performance requirements", Nov. 2003.

* cited by examiner

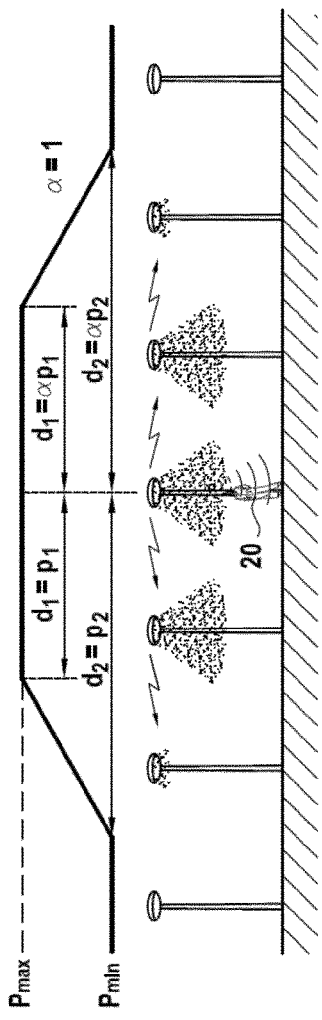
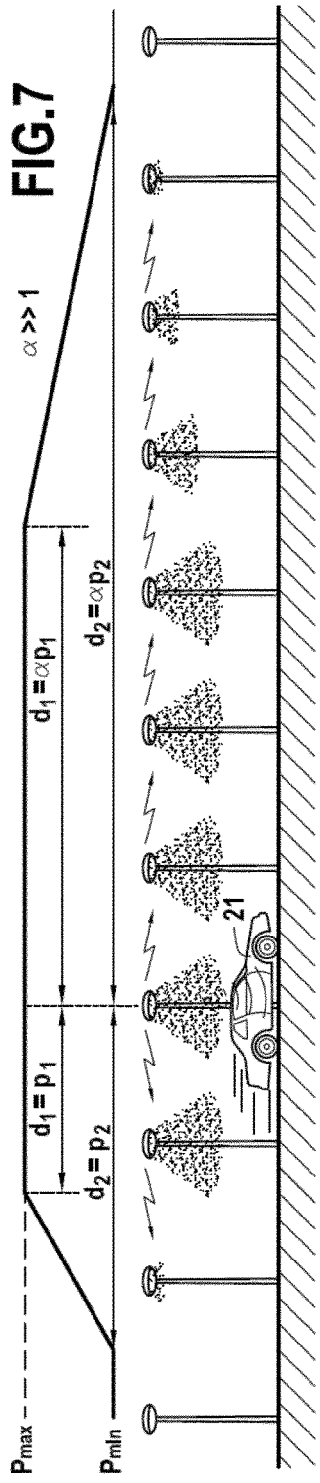
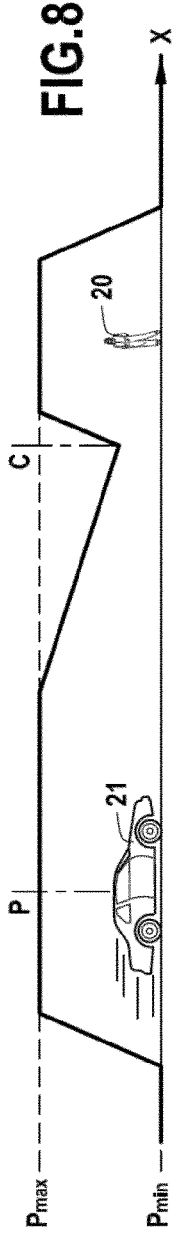

STREET LIGHTING CONTROL, METHOD, DEVICE AND SYSTEM

TECHNICAL FIELD

The present disclosure relates to methods, systems and devices for controlling street lighting, as well as to computer programs for implementing such control methods, and street lighting systems suitable to be controlled by such control methods. By "street lighting" is understood, in the present context, the lighting of any street, road, path, motorway, railroad, tunnel, navigable river, canal, or any other transportation pathway.

BACKGROUND

Nowadays, the power needs of a system have become a key criterion for evaluating its performances. Indeed, higher energy consumption leads to greater costs and added complexity. Quite often, electricity generation might also damage the environment through e.g. greenhouse gas emissions, radioactive waste or other nuisances. These reasons create a strong demand for reducing the energy consumption of street lighting systems.

During the last decade, new lighting technologies such as LEDs (light-emitting diodes) have been successfully used in this domain. However, the high price of LEDs partially counterbalances the benefits provided by their lower energy consumption.

The lower energy consumption for an equivalent lighting level is not the only advantage of the LED technology. In particular, their ability to be switched on and off almost instantaneously, and the absence of any necessary dead time or cooling-off period between being switched off and on again stand in clear contrast to other lighting technologies such as sodium lamps. The additional flexibility offered by this advantage can be used to further decrease the global energy consumption of lighting systems, by adapting light generation more closely to actual demand.

A number of street lighting control methods and devices have been proposed to take advantage of this higher flexibility of some lighting technologies such as LED lighting to decrease global energy consumption of street lighting systems. Using sensors such as induction loops, infrared sensors, radar, etc. to detect the presence of road users, such control methods and devices turn the lighting on only when a road user may require it. By "road user" it is understood, in the present context, any person or vehicle travelling or momentarily stopped on a transportation pathway.

For instance, in the British patent application GB 2 444 734 A, a street lighting method is disclosed which comprises the steps of detecting speed and direction of travel of a road user on a first road segment, issuing a lighting command for said first road segment, and propagating a signal comprising said speed and direction of travel data of the road user through a series of adjacent road segments starting from the first road segment. However, this disclosure fails to specify how these speed and direction of travel data are then used, and does not provide any means to further optimize the light output over the individual road segments.

In the international patent application WO 2011/055259, a street lighting method is disclosed which comprises the steps of detecting a road user on a first road segment, and activating the lighting on another road segment following a previously calibrated temporal relationship. This disclosure, however, does not specify how to adapt the method to road users with greatly different speeds, or to different types of road users, such as motor vehicles and pedestrians.

Finally, in the Canadian patent application CA 2 692 187, a street lighting method is disclosed wherein a signal comprising speed and direction of travel data of a road user is propagated to a series of adjacent road segments starting from the road user's road segment over a distance not greater than a maximum distance calculated as a function of said speed and direction of travel of the road user. However, this disclosure does not specify how to adapt the lighting level to, for instance, variable traffic conditions.

SUMMARY

A first object of the present disclosure is that of providing a method for controlling street lighting over a plurality of interconnected road segments with increased energy efficiency through the ability to adapt the level of street lighting to current traffic conditions. By "road segment" it is understood, in the present context, any area or length of street, road, path, motorway, railroad, tunnel, navigable river, canal, or any other transportation pathway.

Accordingly, in at least one illustrative embodiment, this method comprises the steps of:

detecting speed and direction of travel of a road user on a road segment;

propagating a signal comprising speed and direction of travel data of the road user, and an identification of the road user's road segment, through a series of adjacent road segments starting from the road user's road segment;

dynamically assigning a road class to each road segment on the basis of, at least, stored road type data associated to each road segment and traffic parameters determined for each road segment for a current time period, wherein at least a corresponding maximum lighting level is associated to each road class;

setting a new lighting level equal to said maximum lighting level at each road segment whose distance to the road user is not greater than a first distance; and comparing, for each road segment, said new lighting level with a current lighting level, and changing the current lighting level to the new lighting level if they are different.

By road class, it is understood a set of parameters corresponding to photometric requirements (such as light distribution, light uniformity, power level, . . . ) based on the visual needs of a road user in a road segment, as defined for instance in the European Standard CEN 13201-2:2003 and International Energy Commission technical report CIE 115: 2010. Road classes and lighting classes are considered equivalent in the present application. Examples of road classes and performance requirements are reported in the European standard CEN 13201-2:2003.

By road type, it is understood a road category based on fixed parameters such as geometrical characteristics of the road (width, number of lanes and the like), nature of its users (motor vehicle, bicycle, pedestrian and the like) and an allowed speed limit.

It is further understood that the road type parameters are part of the set of parameters used to define a road class. It is also understood that a road class further includes variable parameters such as mean traffic per hour, also referred to as traffic density. The road class may further include one or more of following parameters: ground reflective coefficient, ambient lighting, atmospheric conditions, visual complexity, assault risk or difficulty of a navigation task.

By dynamically assigning a road class, as defined above and a corresponding maximum lighting level to each road segment, the lighting commands for each individual road segment, when issued in response to a road user on this or another road segment, will be adapted to the current traffic situation on each road segment, as well as to the specific road type of the road segment to be lighted. Consequently, energy efficiency will be increased while still providing an appropriate lighting level for each road segment. Apart from said maximum lighting level, additional lighting parameters, such as, for instance, a lighting spectrum, may also be associated to each road class.

This method may also comprise a step of selecting a subset of eligible road classes for each road segment, for instance on the basis of road user information contained in said signal, before dynamically assigning to each road segment a road class selected from said subset on the basis of, at least, stored road type data associated to each road segment and traffic parameters determined for each road segment for a current time period. The lighting parameters can thus be even more efficiently optimised for each situation.

The traffic parameters on the basis of which a road class is assigned to a given road segment may relate at least to speed and density of road users on that road segment over said time period. The lighting level may thus be adapted to the traffic flow.

Said first distance may be calculated on the basis of said speed and/or direction of travel of the road user, although other parameters may also be considered, such as for instance road user recognition and/or identification on the basis of sensor data. Consequently, for a rapidly-moving road user, such as a motor vehicle, this first distance may be significantly greater than for a stationary or slow road user, such as a pedestrian, in particular in the direction of travel.

It indeed can be preferred to have a longer visibility distance in front of the road user than behind it. This asymmetry may become more important with the increased braking distance at higher speeds. Therefore, said first distance, beyond which the signal indicating a road user is no longer propagated to further road segments, may be greater by an asymmetry factor in the direction of travel of the road user than in a different direction, wherein said asymmetry factor may also be calculated on the basis of said speed of the road user.

In order to provide a more visually comfortable smooth transition between lighted and unlighted road segments, beyond said first distance from the road user, each road segment may be set a new lighting level gradually decreasing towards a predetermined minimum lighting level at a second distance greater than said first distance. This decrease may be, for example but not necessarily, linear.

As signals indicating the same or different road users propagate through different series of adjacent road segments, they may concurrently reach the same road segment, each concurrently incoming signal potentially leading to a different new lighting level. To prevent a conflict, upon concurrent reception of a plurality of said signals at a single road segment, a new lighting level may be set for each signal for which the distance to the road user is not greater than said second distance, but the current lighting level for this road segment compared only with the highest of these new lighting levels and changed to this highest new lighting level if the highest new lighting level is different from the current lighting level.

Of course, whether lighting is wished at all, and some features of this lighting, such as light colour or position, may also depend on environmental factors, and in particular on the ambient light level. To take this into account, the street lighting control method may further comprise a step of determining an environmental parameter, such as an ambient light level, and maintain the lighting level for a road segment at a predetermined minimum lighting level unless said environmental parameter fulfills a predetermined condition.

This control method may be implemented using a computer or other electronic data processing system. Therefore, the present disclosure also relates to a computer program for implementing this control method, as well as to a computer-readable data storage medium containing an instruction set for implementing this control method, and to a data processing unit programmed to implement this control method. Such a data storage medium may comprise a volatile or non-volatile solid-state memory, such as for instance random-access memory (RAM), read-only memory (ROM), or electrically erasable programmable read-only memory (EEPROM), and/or any other carrier which may contain data in a computer-readable form, including magnetic and/or optical data carrier.

Another object of the disclosure is that of providing a device for controlling street lighting on a road segment, which can be integrated in a distributed control system providing increased energy efficiency through the ability to adapt the street lighting to current traffic conditions in each road segment.

Consequently, in at least an illustrative embodiment of a control device according to the present disclosure, said device comprises a data processing unit with data storage, a first and a second data input channels, a data output channel and a control output channel. The first data input channel is suitable for receiving a signal comprising speed and direction of travel data of a road user on said road segment, whereas the second data input channel is suitable for receiving, from an adjacent road segment, a signal comprising speed and direction of travel data of a road user on said adjacent road segment or on another road segment connected to the control device's road segment over said adjacent road segment and identification data of the road user's road segment. The data output channel is suitable for transmitting, to an adjacent road segment, a signal comprising road user speed and direction of travel data received over said first and/or second data input channels, and identification data of the road user's road segment, whereas the control output channel is suitable for outputting a lighting command signal to a lighting unit Furthermore, the data processing unit is configured to:

dynamically assign a road class to the control device's road segment on the basis of, at least, said road type data and traffic parameters determined for this road segment for a current time period, said road class being associated with a corresponding maximum lighting level;

set a new lighting level equal to said maximum lighting level for the assigned road class upon reception of road user speed and direction of travel data over said first and/or second data input channels if a distance to the road user is not greater than a first distance calculated as a function of said speed and direction of travel of the road user; and compare said new lighting level with a current lighting level of the lighting command signal, and change the current lighting level to the new lighting level if they are different.

This device can thus individually control a lighting unit for lighting its corresponding road segment, and at the same time be integrated in a system comprising a plurality of such devices sharing road user information to implement an energy-efficient lighting control method over a plurality of interconnected road segments. A new lighting level may be set not only upon reception of new road user data, but also on the basis of extrapolated data after a given time interval.

Moreover, said data processing unit may be configured to set a new lighting level between the maximum lighting level and a minimum lighting level for the assigned road class if said distance to the road user's road segment is between said first distance and a second distance greater than said first distance.

Furthermore, the data processing unit may also be configured to modify said lighting command signal in response to an incoming emergency signal. Said emergency signal may be received, for instance, over any one of said first and second data input channels, or over a separate emergency input channel connected for example to an emergency button. The control device may thus respond to an emergency by changing lighting parameters such as for instance lighting intensity, spectrum or continuity over the corresponding road segment. For example, it may start blinking to signal the emergency to incoming road users.

The present disclosure also relates to a system for controlling street lighting on a plurality of interconnected road segments, said control system comprising such a control device for each of said interconnected road segments, each one of the control devices being connected to at least another one of the control devices, which corresponds to an adjacent road segment, for the transmission of road user speed, direction of travel and road segment identification data between the control devices. Such a distributed system can thus ensure a robust and energy-efficient control of the street lighting of the plurality of interconnected road segments.

Moreover, the present disclosure also extends to street lighting system comprising a sensor set for detecting speed and direction of travel of road users on a plurality of interconnected road segments and, for each of said interconnected road segments, a lighting unit and such a control device connected thereto, each one of the control devices being also connected to said sensor set and to at least another one of the control devices, which corresponds to an adjacent road segment, for the transmission of road user speed, direction of travel and road segment identification data between the control devices. In particular, said sensor set may comprise at least one sensor unit individually connected to one of the control devices, for detecting at least speed and direction of travel of a road user on that control device's road segment. The sensor set may thus be a distributed sensor set, with a sensor unit individually associated to each road segment and control device, further ensuring the robustness of the entire street lighting system.

The above summary of some example embodiments is not intended to describe each disclosed embodiment or every implementation of the invention. In particular, selected features of any illustrative embodiment within this specification may be incorporated into an additional embodiment unless clearly stated to the contrary.

BRIEF DESCRIPTION OF THE DRAWINGS

The invention may be more completely understood in consideration of the following detailed description of various embodiments in connection with the accompanying drawings, in which:

FIG. 6 schematically illustrates the light distribution on a series of adjacent road segments around a slow road user, such as a pedestrian;

FIG. 7 schematically illustrates the light distribution on a series of adjacent road segments around a fast road user, such as a motor vehicle;

FIG. 8 schematically illustrates the light distribution on a series of adjacent road segments around two road users;

Figure 1:
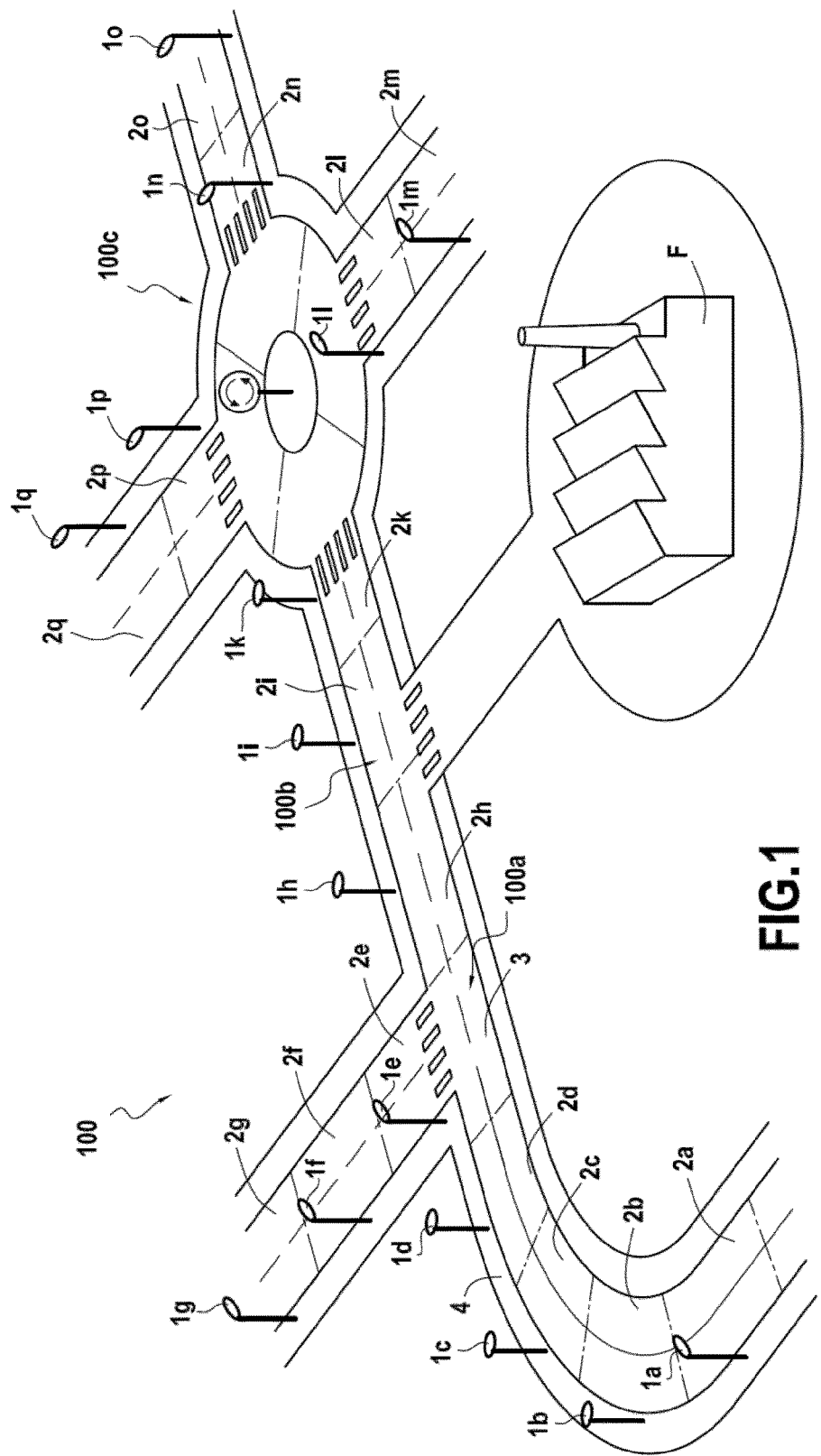
FIG. 1 schematically illustrates a road network with a street lighting system comprising a plurality of streetlights.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the scope of the invention.

DETAILED DESCRIPTION

For the following defined terms, these definitions shall be applied, unless a different definition is given in the claims or elsewhere in this specification.

As used in this specification and the appended claims, the singular forms "a", "an", and "the" also include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

An example of a road network 100 equipped with a street lighting system according to an embodiment of the invention is illustrated in FIG. 1. This street lighting system comprises a plurality of streetlights 1a to 1q distributed over the road network 100. Each streetlight 1a to 1q is arranged so as to light a corresponding road segment 2a to 2q of said road network 100. The distance between 2 streetlights is generally 30m. At installation of the streetlights, at least their respective GPS coordinates are encoded in the data storage unit, as well as the distance to their first neighbouring streetlights. These road segments 2a to 2q are interconnected and form two junctions 100a, 100b, as well as a roundabout 100c on the road network 100. In the illustrated embodiment, each road segment 2a to 2q comprises a pavement 3 for vehicles and a sidewalk 4 for pedestrians. The invention may however be also applied to other road network configurations, including for example pedestrian or cycle paths, motorways without sidewalks, etc.

Figure 2:
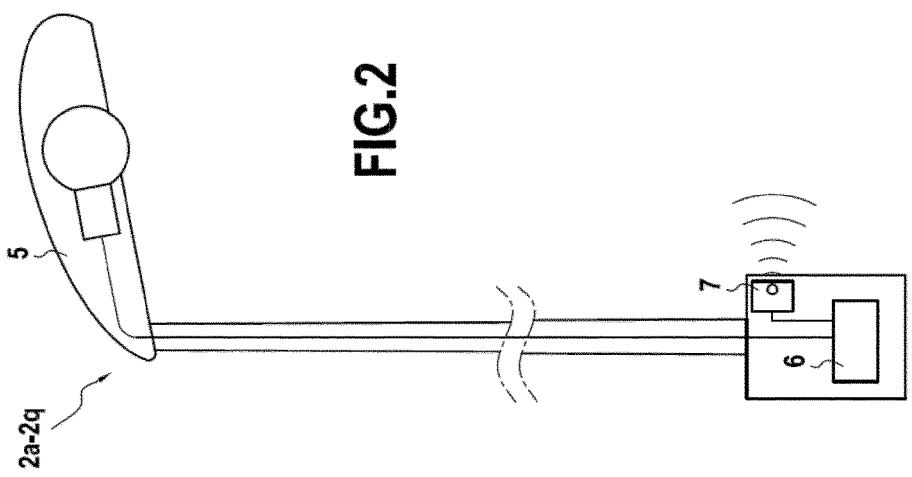
FIG. 2 schematically illustrates a streetlight of the road network of FIG. 1, with a control device according to an embodiment, together with a sensor unit and a lighting unit.

As illustrated in FIG. 2, each streetlight 1a to 1q comprises a lighting unit 5, a control device 6 and a sensor unit 7. It may be connected to an external power supply, eventually over a power converter, and/or to an internal power supply, such as solar cells, a wind turbine, and/or batteries.

The lighting unit 5 may be a LED-based lighting unit wherein, in the present context, the term LED is understood as including any one of a variety of semiconductor-based structures configured so as to emit light in response to current, light emitting polymers, organic light emitting diodes, electroluminescent strips, and the like, without being limited to these. However, lighting units using other light sources than LED light sources may be considered, such as for example a HID (high-intensity discharge) light source. The lighting unit 5 may in particular be configured to emit light in the visible light spectrum (that is, between approximately 400 and 700 nm wavelength), but other wavelengths, such as infrared or ultraviolet, may also be considered. Within the visible light spectrum, the lighting unit 5 may be configured to emit in a large spectrum of wavelengths, so as to obtain a white light, or within a narrower one, so as to obtain a coloured light. For example, the lighting unit 5 may be a model with reference: Cree XLamp XP-G{CW/NW/WW}, containing 40 LEDs per unit. The lighting unit may be at different heights from the street, for example at a height comprised between 1 and 30 m, for example at a height of 12.5 m.

The sensor unit 7 is configured to detect the presence of road users on the road segment 2a-2q to be lighted by the lighting unit 5 of the streetlight 1a-1q, as well as at least their speed and direction of travel, although additional information such as for instance position, acceleration or type of road user may also be captured. This sensor unit 7 may include one or several sensors such as, for example, radar or infrared sensors (and in particular passive infrared, or "PIR", sensors). For example, the sensor unit 7 may include a PIR sensor (passive infrared sensor) and a Doppler effect sensor. The sensor output level is initially fixed, for each sensor, in order to trigger detection for a user (pedestrian, cyclist, vehicle . . . ), but not an animal or a temporary glint in the sensor.

Although in the illustrated embodiment the sensor unit 7 is incorporated directly in each streetlight 1a-1q, at least part of the sensor unit 7 may be remote of the streetlight 1a-1q, including for instance at least an induction loop on or directly under the surface of the corresponding road segment 2a-2q for detecting road users located over this induction loop. In general, both sensors and lighting elements to be connected to a control device 6 for controlling the lighting of a given road segment may be distributed over the entire road segment. So, for instance, a single control device may be connected to several streetlights, or other lighting devices, distributed over that road segment, in order to control them simultaneously. Eventually, speed, direction of travel and eventual additional data about road users over a given road segment may even be captured by an at least partially remote sensor set and transmitted to the control device controlling the lighting of that road segment, for instance over a telecommunication network.

Figure 3:
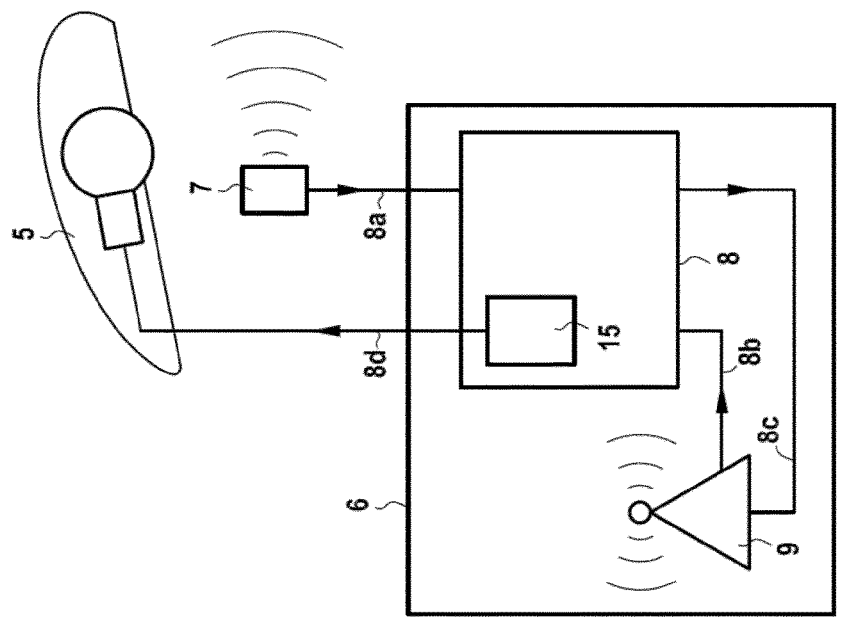
FIG. 3 schematically illustrates the control device of the streetlight of FIG. 2.

The control device 6 is schematically illustrated on FIG. 3. It comprises a data processing unit 8, such as a microprocessor, digital signal processor, field-programmable gate array, etc., with data storage 15 which may comprise a volatile or non-volatile solid-state memory, such as for instance random-access memory (RAM), read-only memory (ROM), or electrically erasable programmable read-only memory (EEPROM), and/or any other carrier which may contain data in a computer-readable form, including magnetic and/or optical data carrier, or a combination thereof. This data storage may in particular comprise road type data of the corresponding road segment 2a-2q which may be relevant in determining a lighting level for that road segment 2a-2q, such as size and category of the road. For example, the data storage 15 comprises velocity dependent parameters $p_1$, and GPS coordinates of the streetlight. The data storage may further comprise a set of road classes associated with speed and traffic density and a corresponding maximum lighting level $P_{max}$. The data processing unit 8 also comprises at least a first and a second data input channels 8a, 8b, a data output channel 8c and a control output channel 8d.

The first data input channel 8a is connected to the sensor unit 7 so as to receive signals comprising at least speed and direction of travel data of a road user detected by the sensor unit 7 on the corresponding road segment 2a-2q. This connection may be digital or analog.

The control output channel 8d is connected to the lighting unit 5, possibly over a power management unit, so as to transmit to this lighting unit 5 a lighting command specifying a lighting level at which the corresponding road segment 2a-2q is to be lighted by the lighting unit 5.

The control device 6 also comprises a transceiver 9 which is connected at least to said second data input channel 8b and to the data output channel 8c. In the present context, the term "transceiver" is understood as referring to any device suitable for both transmitting and receiving information, whether it is wirelessly or over a physical connection such as an electrical wire, optical fibre or waveguide. The transceiver 9 of each one of the streetlights 1a-1q of the present embodiment is configured so as to communicate with the transceiver 9 of at least a neighbouring streetlight 1a-1q on an adjacent road segment 2a-2q. Any suitable protocol may be used for data transmission, such as e.g., TCP/IP, Ethernet, USB, Bluetooth®, FireWire®, Zigbee®, Xbee Technology, any one of the IEEE 802.11 wireless communications protocols, token ring, token bus, serial or parallel bus connections, power line communication protocols, or any other suitable wireless or wired protocol.

The control device 6 is configured so as to receive and transmit at least road user speed and direction of travel data over said transceiver 9. In particular, the second data input channel 8b of the data processing unit 8 is adapted to receive, over said transceiver 9, from an adjacent road segment 2a-2q, a signal comprising speed and direction of travel data of a road user on said adjacent road segment 2a-2q or on another road segment 2a-2q connected to the control device's road segment over said adjacent control device, and identification data of the road segment 2a-2q on which the road user is located. The data output channel 8c is, in turn, adapted to transmit, over said transceiver 9, to an adjacent road segment 2a-2q, a signal comprising road user speed and direction of travel data received over said first and/or second data inputs 8a, 8b, and identification data of the road segment 2a-2q on which the road user is located. The control device 6 for each road segment 2a-2q will thus be able to receive and transmit road user speed and direction of travel data both for road users detected by the sensor unit 7 on the same road segment 2a-2q, and for road users detected on other road segments, and to identify on which road segment 2a-2q that road user is located.

The control device 6, may also receive, from the sensor unit 7 and/or over the transceiver 9, other environmental information such as, for instance, an ambient light level, or a weather state, information that may also be applied in the control of the lighting unit 5, or transmitted to other control devices over the transceiver 9.

Furthermore, the control device 6 may also receive and transmit, over said transceiver 9, rules and rule updates for the data processing unit 8, in particular concerning how the control device 6 will control the lighting unit 5 in response to incoming signals, and also under which conditions it may transmit road user speed and direction of travel data to adjacent road segments.

Figure 4:
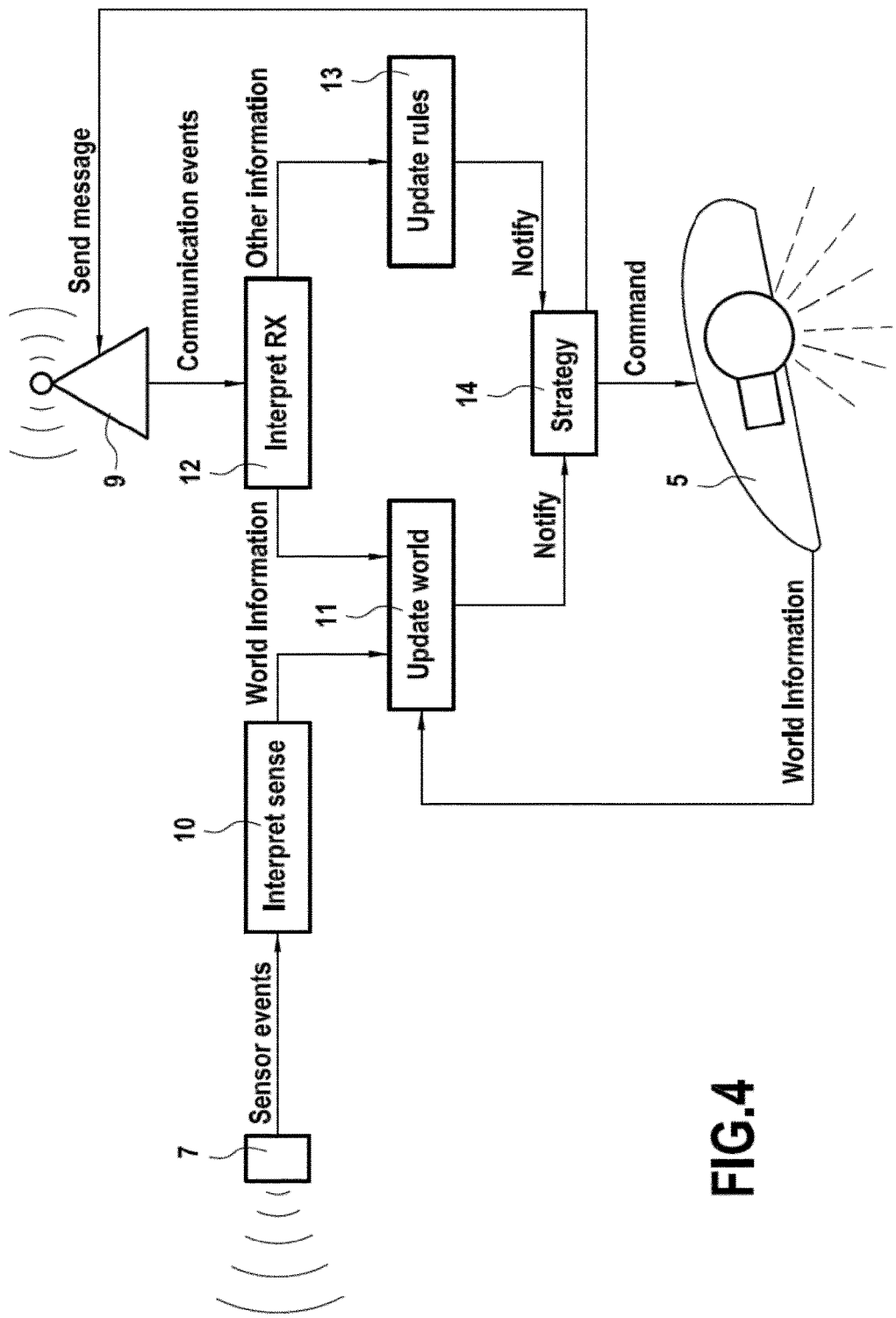
FIG. 4 illustrates a state diagram of the control device of FIG. 3.

FIG. 4 illustrates, in general terms, how information is processed within the data processing unit 8. This data processing unit 8 processes two basic types of information: so-called "world information" and other information.

"World information" is understood, within this context, as meaning any kind of data referring to the environmental situation around the streetlight 1a-1q or on its corresponding road segment 2a-2q, or information relating to any road user. This information can be provided by the sensor unit 7, feedback from the lighting unit 5, another control device 6 or any other device that may communicate with this control device 6 over the transceiver 9. Such information can be, but is not restricted to, for example, the presence of a road user (vehicle or pedestrian) at a given position, its speed and direction of travel, a time since a given event, etc.

The remaining information may be any kind of information to be used by the control device 6, or the parameterization of its behavior. Any kind of information that is not considered as "world information" can thus be considered as belonging in the "other information" category. This "other information" may also be received by the control device 6 from the equivalent control device of another streetlight 1a-1q, or from any other device capable of transmitting a message to the control device 6, such as for example, but not only, a computer used by technical staff. This "other information" may include, for example, a lighting level for a given situation, status information, a description of a road class, monitoring information, etc.

The control device 6 can change its state in response to at least two types of events: sensor events, and communication events.

So-called "sensor events" correspond to information transmitted by the sensor unit 7 to the data processing unit 8 over its first data input channel 8a. This information may be transmitted analogously, for example through a voltage level, or digitally in the form of a binary sequence. This information is processed by the data processing unit 8 in its "interpret sense" state 10, in a set of operations which may include, for example, an analog to digital conversion, a protocol decryption, a mathematical operation, or any combination thereof. The processed "sensor events" information is then incorporated into a "world message", to be used in a subsequent "update world" state 11.

So-called "communication events" information received by the data processing unit 8 through the transceiver 9 and its second data input channel 8b, information thus sent by another control device or by another device capable of transmitting a message to the control device 6. This "communication events" information is processed by the data processing unit 8 in its "interpret RX" state 12, in a set of operations which may include, for example, an analog to digital conversion, a protocol decryption, a mathematical operation, or any combination thereof, and which will determine whether the incoming "communication events" information relates to "world information" or to "rules information".

If the processed "communication events" information relates to "world information", it is also incorporated into a "world message" to be used in the "update world" state 11, like the processed "sensor events" information and feedback information from the lighting unit 5. However, if the processed "communication events" information relates to "rules information", it is then used in the "update rules" state 13.

In the "update world" state 11, the data processing unit 8 updates stored "world information" on the basis of the incoming "world information" processed in the "interpret sense" and "interpret RX" states 10, 12 and/or the feedback from the lighting unit 5, and notifies those updates for their application by the data processing unit 8 in its "strategy" state 14. In its "strategy" state 14, the data processing unit 8 applies a stored strategy, updated in the "update rules" state 13, to the updated "world information" in order to determine a lighting level command to be transmitted to the lighting unit 5, as well as which information is to be transmitted to control devices 6 of the streetlights 1a-1q of adjacent road segments 2a-2q.

In this "update rules" state 12, the data processing unit 8 updates the stored strategy on the basis of the incoming "rules information" and notifies the updates to be applied by the data processing unit 8 in the "strategy" state 13.

Figure 5:
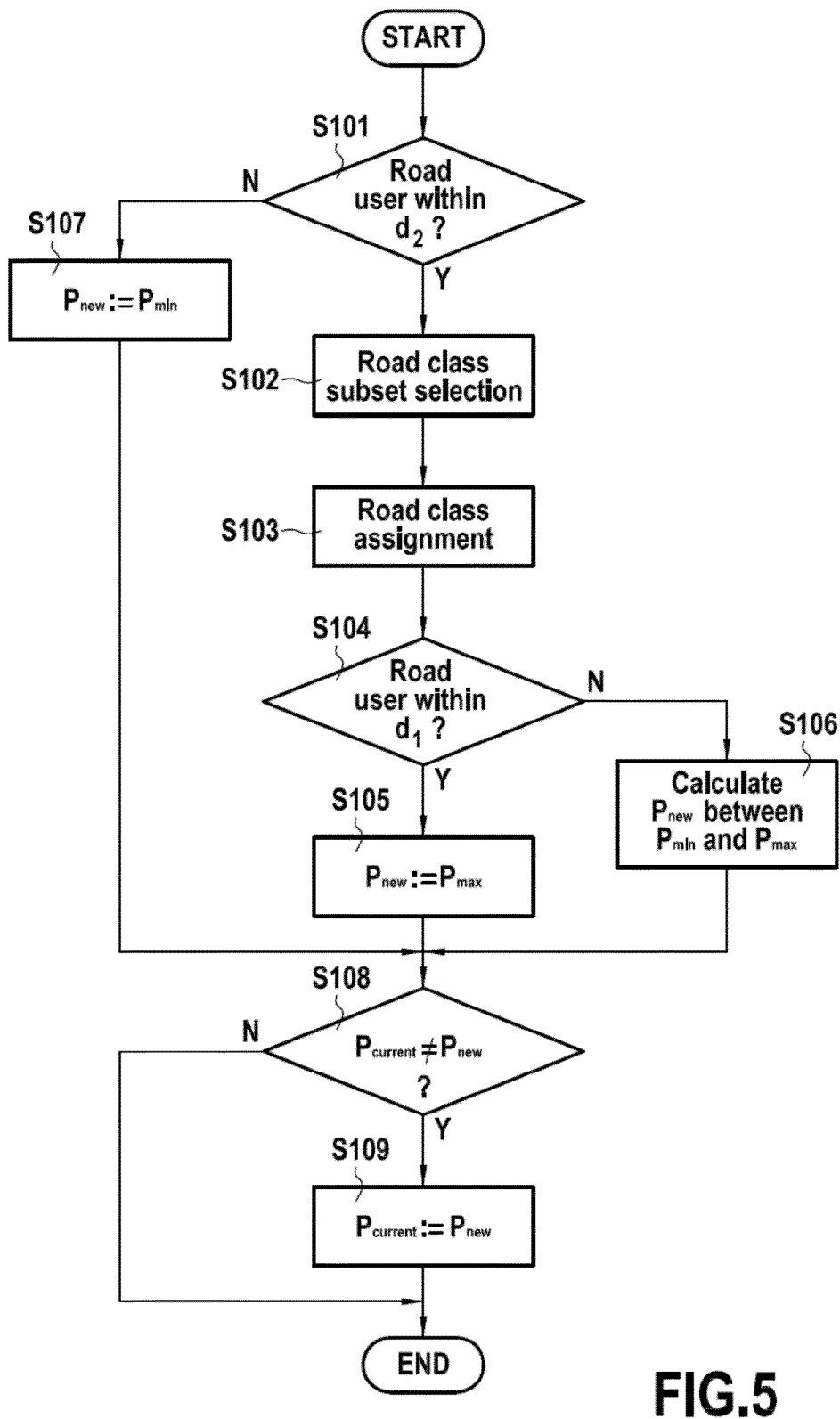
FIG. 5 illustrates a flow chart corresponding to a control method of a streetlight of FIG. 2.

FIG. 5 illustrates how such a strategy is applied by the data processing unit 8 to control the lighting unit 5.

In a first step S101, the data processing unit 8 determines, on the basis of the incoming "world information" from the sensor unit 7 and/or the transceiver 9, whether there is a road user at a distance d not greater than a distance $d_2$ from the road segment 2a-2q of the control device 6.

This distance $d_2$ is calculated on the basis of at least the speed and direction of travel of the road user. In particular, this distance $d_2$ may increase at a higher speed of the road user and, for the same speed, it may be greater by an asymmetry factor $\alpha$ for an incoming road user than for an outgoing road user. The asymmetry factor $\alpha$ may itself be dependent on the speed and/or type of road user, so that it is for example equal or only slightly higher than 1 for a pedestrian or another type of slow road user, whereas it is significantly higher than 1 for a fast road user, such as a motor vehicle. Thus, the distance $d_2$ may be equal to a first velocity-dependent parameter $P_2$ for an outgoing road user and equal to the product of this first velocity-dependent parameter $P_2$ and said asymmetry factor $\alpha$ for an incoming road user. Specific values for these parameters $\alpha$ and $P_2$ may be associated to corresponding speed ranges using look-up tables. An example is given in Table 1.

TABLE 1 parameters $\alpha$, $p_1$ and $p_2$ for related speed ranges

| Speed (km/h) | parameter $\alpha$ | parameter $p_1$ (m) | parameter $p_2$ (m) |
|---|---|---|---|
| v ≤ 5 | 1 | 90 | 175 |
| 5 < v ≤ 30 | 1.2 | 75 | 121 |
| 30 < v ≤ 60 | 1.5 | 83 | 118 |
| v > 60 | 2 | 95 | 119 |

If in step S101 it is determined that there is such a road user within said distance $d_2$, in the next step S102, the data processing unit 8 selects, on the basis of the incoming "world information" regarding the road user, for instance its speed and type, a subset of eligible road classes for the road segment 2a-2q from among a set of road classes as defined, for instance in the European standard CEN 13201-1:2004 and International Energy Commission technical report CIE 115:2010, and each associated to at least corresponding maximum lighting level $P_{max}$, and eventually additional lighting parameters such as a lighting colour spectrum. An example of set of road classes is given in Table 2. It is well-known in the art how to select a lighting class and how to obtain the associated maximum lighting level $P_{max}$. In particular, it is well-known that the maximum lighting level is dependent upon several parameters such as the type of lighting unit, the distance between 2 lighting units and the height of the lighting unit.

TABLE 2 set of road classes and corresponding $P_{max}$ (calculated on the basis of the lighting unit type used in the examples)

| Speed (km/h) | Mean traffic per hour | Road class | $P_{max}$ (W) |
|---|---|---|---|
| v ≤ 5 | | ME4 | 46 |
| 5 < v ≤ 30 | | ME5 | 69 |
| 30 < v ≤ 60 | # <292 | ME4 | 69 |
| | # ≥292 | ME5 | 104 |
| v > 60 | | ME6 | 104 |

In the following step S103 it then assigns to the road segment 2a-2q a road class from among this subset of eligible road classes. This dynamic assignment in step S103 is made on the basis of road type data stored at the data storage 15 of the data processing unit, together with traffic parameters determined for this road segment 2a-2q for a current time period. These traffic parameters, which may include in particular road user speed and density over this road parameter during the current time period, may be established on the basis of "world information" such as incoming measurements from the sensor unit 7 and/or predictions based for instance on measurements made on the same road segment 2a-2q over equivalent time periods, e.g. at the same time of the day. The traffic density may for example be calculated by recording the number of road users during a period of 5 minutes.

In the next step S104 the distance d to the road user is compared to another distance $d_1$, smaller than abovementioned distance $d_2$. Like said distance $d_2$, this distance $d_1$ may be greater by said asymmetry factor α for an incoming road user than for an outgoing road user. Accordingly, the distance $d_1$ may be equal to another velocity-dependent parameter $p_1$ for an outgoing road user, and equal to the product of this other velocity-dependent parameter $p_1$ and said asymmetry factor α for an incoming road user. Like those of parameters α and $p_2$, the value of parameter $p_1$ may be determined on the basis of look-up tables associating predetermined values to specific speed ranges, as for example given in Table 1. Although in the illustrated embodiment the same asymmetry factor α is used for distances $d_1$ and $d_2$, alternatively different asymmetry factors $α_1$ and $α_2$ may be used for each one of distances $d_1$ and $d_2$.

If in step S104 it is determined that the distance d to the road user is not greater than said distance $d_1$, in the next step S105 the data processing unit 8 will set a new lighting level $P_{new}$ equal to a maximum lighting level $P_{max}$ for its assigned road class. If, however, it is determined that the distance d to the road user is greater than distance $d_1$, but not greater than distance $d_2$, the data processing unit 8 will set in alternative step S106 a new lighting level $P_{new}$ higher than a minimum lighting level $P_{min}$, but lower than the maximum lighting level $P_{max}$ for its road class.

The minimum lighting level $P_{min}$ may be an arbitrary security level. When no minimum lighting level is specified by the standard, it may be for example the lowest lighting power allowed by the lighting unit. It may also be zero.

This lighting level $P_{new}$ may be calculated to offer a progressive reduction of the lighting level from distance $d_1$ to distance $d_2$. For example, in step S106 this new lighting level $P_{new}$ may be calculated according to the linear formula $P_{new}=P_{max}-(d-d_1)(P_{max}-P_{min})/(d_2-d_1)$.

It must be noted that, in step S101, the data processing unit 8 may have determined that there is a plurality of road users at distances d not greater than their corresponding greater distances $d_2$. In that case, steps S102 to S106 may be performed separately for each of said plurality of road users, and an alternative new lighting level $P_{new}$ set on the basis of each one of them.

If, however, in said first step S101, the data processing unit 8 determines that there isn't any road user within such a corresponding distance $d_2$, in step S107 it will set the new lighting level $P_{new}$ equal to a predetermined minimum lighting level $P_{min}$, which may be zero.

After any one of said steps S105, S106 or S107, the data processing unit 8 compares in step S108 the current lighting level $P_{current}$ of the lighting command issued by the control device 6 to the lighting unit 5 to the new lighting level $P_{new}$ or, if a plurality of alternative new lighting levels $P_{new}$ have been calculated, to the highest of these alternative lighting levels $P_{new}$. If said new lighting level or highest new lighting level $P_{new}$ is different from the current lighting level $P_{current}$, the data processing unit 8 proceeds then to update said current lighting level $P_{current}$ in step S109 by changing said current lighting level $P_{current}$ to the new (or highest new) lighting level $P_{new}$. Consequently, the lighting command issued by the control device 6 to the lighting unit 5 changes, and the lighting level at which the corresponding road segment 2a-2q is lighted changes accordingly.

The process illustrated in FIG. 5 may be repeated with a high frequency, for instance each few milliseconds. Each time, the position of each road user may be recalculated, eventually on the basis of new incoming "world information" data, but mostly by extrapolation from previously received "world information" data. Said position may be an approximated position, based only on the identification of the road segment on which the road user is detected, or a more accurate position based on position data captured by the sensor set and propagated through the road segments together with the speed and direction of travel data, and eventually extrapolated from such position data after a given time interval, using said speed and direction of travel data.

Consequently, this method, applied for each streetlight at each road segment of a road network formed by a plurality of interconnected road segments, ensures that the streetlights light the road segments around each road user, the illuminated area moving with each road user so as to save energy. FIGS. 6 and 7 illustrate the illuminated series of adjacent road segments around two road users of different types on a straight road. In FIG. 6, a pedestrian 20 is walking on the road. As this road user is recognised as a pedestrian by the sensor unit monitoring the road segment on which this road user is located, for instance because of its low speed, the asymmetry factor α is set equal to 1, and the parameters $p_1$ and $p_2$ are set at relatively low levels. As can be seen on FIG. 8, this results on the information relating to this pedestrian 20 being propagated over only a short series of road segments in each direction, with the road being thus illuminated over the same short distance in front of and behind the pedestrian 20.

In FIG. 7, a motor vehicle 21 is travelling along this road at significant speed. As a result, the asymmetry factor α is set significantly higher than 1, so that information concerning this road vehicle is relayed over a significantly longer series of adjacent road segments, and the road illuminated over a significantly longer distance, in front of this road vehicle 21 than behind it. A plurality of different road users may be sharing the same roads. FIG. 8 illustrates a case wherein, on the same straight road, a motor vehicle 21 approaches a pedestrian 20 from behind. In such a case, the lighting level for each road segment should normally be set not lower than it would be set for each one of these road users 20, 21. FIG. 8 illustrates how the two illuminated areas merge into a single one at point C.

Figure 9A:
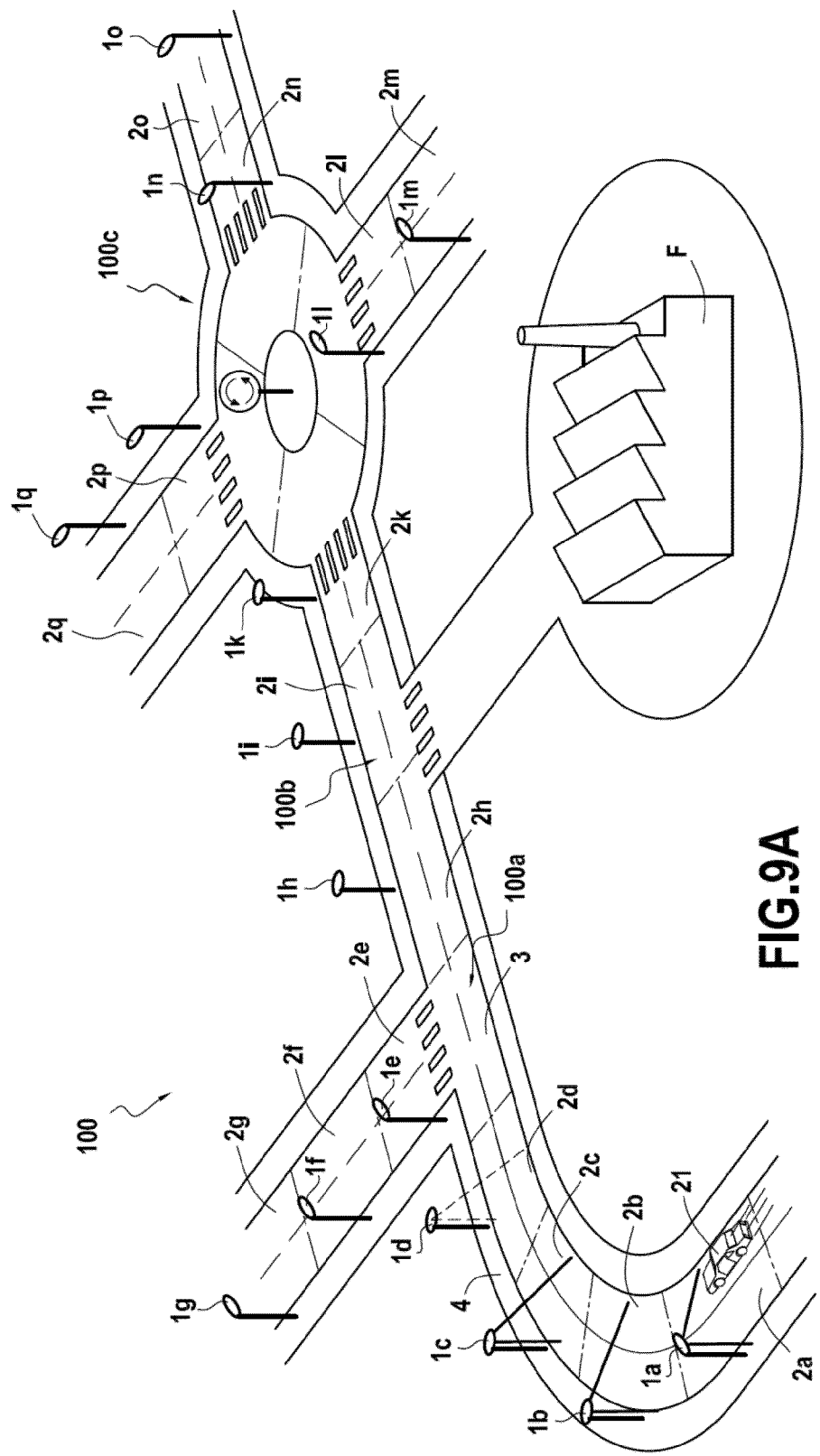
FIGS. 9A-9E illustrate the road network of FIG. 1 in a first traffic situation.

FIGS. 9A to 9E illustrate a first case in which a single road user, a motor vehicle 21, travels through the road network 100 of FIG. 1, wherein the minimum lighting level $P_{min}$ for each road segment 2a-2q is 11.3 W. As seen in FIG. 9A, the motor vehicle 21 enters the illustrated area through road segment 2a. Its speed and direction of travel are sensed by the sensor unit 8 of the corresponding streetlight 1a and a signal comprising these data, together with identification data of the road segment 2a, is propagated through a series of adjacent streetlights. In response to this signal, the streetlights 1b, 1c and 1d, which are within a distance $d_2$ from the first road segment 2a, light up together with the first streetlight 1a. Streetlights 1a, 1b and 1c light up at the maximum lighting level $P_{max}$ corresponding to their assigned road class, while streetlight 1d, which is beyond a smaller distance $d_1$ from the first road segment 2a, lights up at a lower lighting level.

Figure 9B:
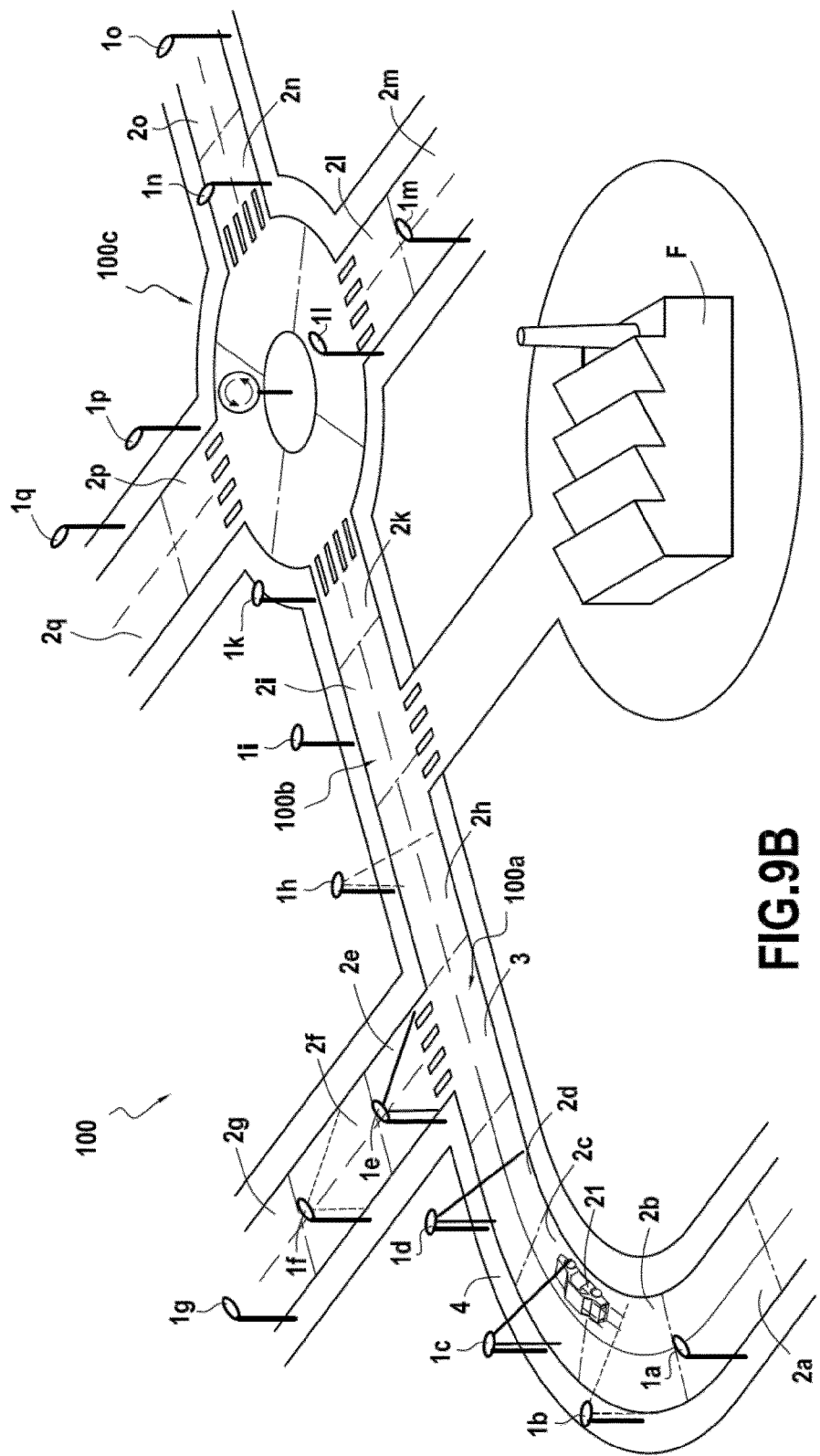

As seen in FIG. 9B, as the motor vehicle 21 progresses through the road segments 2b and 2c, and is detected by the sensor units of the corresponding streetlights 1b and 1c, more streetlights are turned on in front of the motor vehicle 21, and those which are initially turned on at lower lighting levels than their assigned maximum lighting level $P_{max}$ are progressively powered up to that maximum lighting level $P_{max}$ as the motor vehicle 21 approaches. As the motor vehicle 21 approaches the bifurcation beyond road segment 2e, at the first road crossing 100a, the streetlights 1f and 1h on both branches of this bifurcation are turned on. At the same time, the streetlights behind the motor vehicle 21 are gradually turned off again, starting with the first streetlight 1a. The signals from the successive road segments on which the motor vehicle 21 travels update not just the position of the motor vehicle 21, but also its speed. This thus allows adjustments of the distances $d_1$ and $d_2$, both in front and behind the motor vehicle 21, in response to these updates, to better adapt the lighting level of each individual streetlight.

Figure 9C:
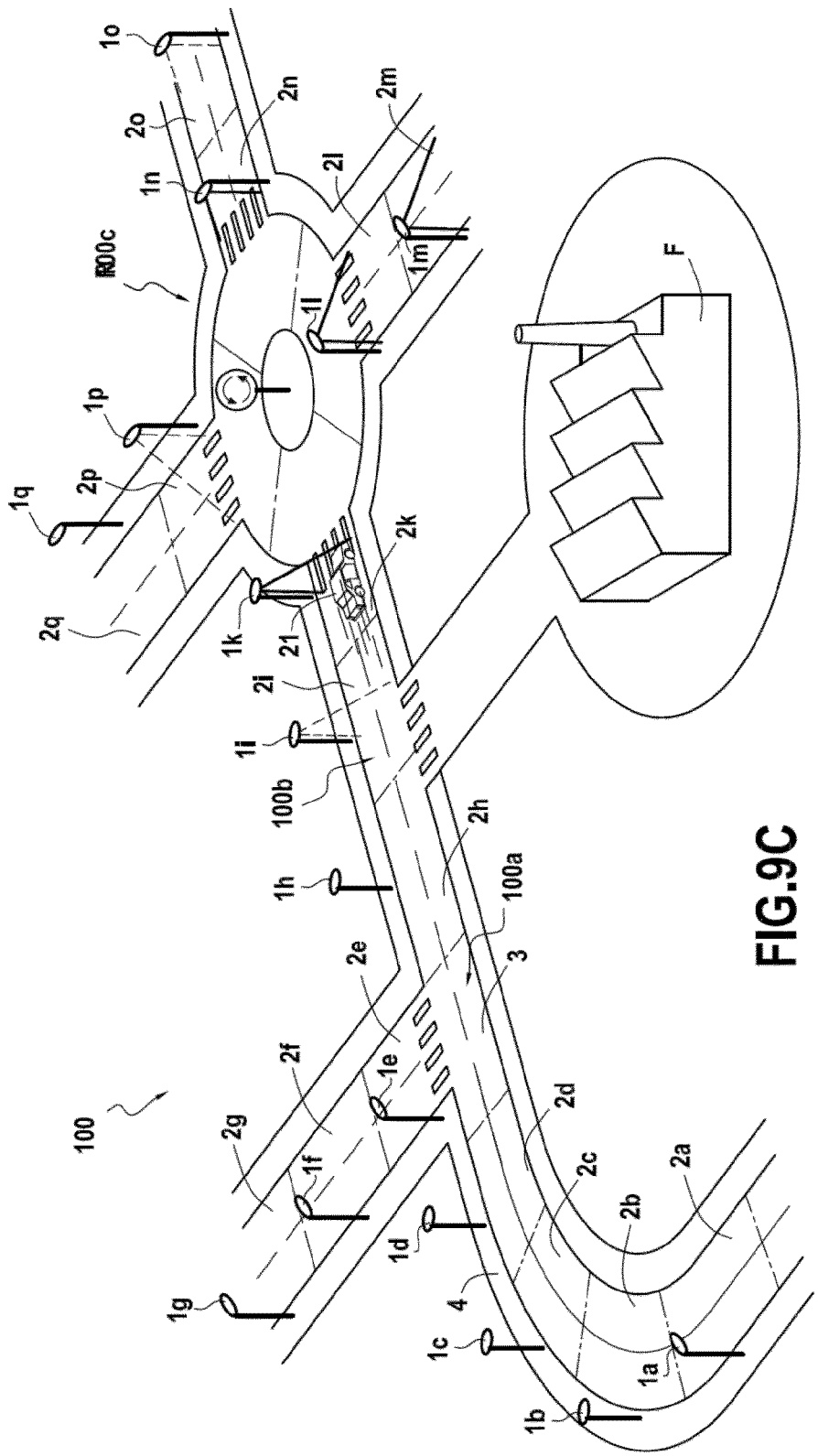

Once the motor vehicle 21 drives past the first crossing 100a, through road segment 2h and beyond, as illustrated on FIG. 9C, it approaches the roundabout 100c through road segment 2k. The streetlights behind the motor vehicle 21, including those on the branches which it did not take, are successively turned off. In front of the motor vehicle 21, on the other hand, the streetlights on the roundabout 100c are successively turned on, including those on its exits, like streetlight 1m.

Figure 9D:
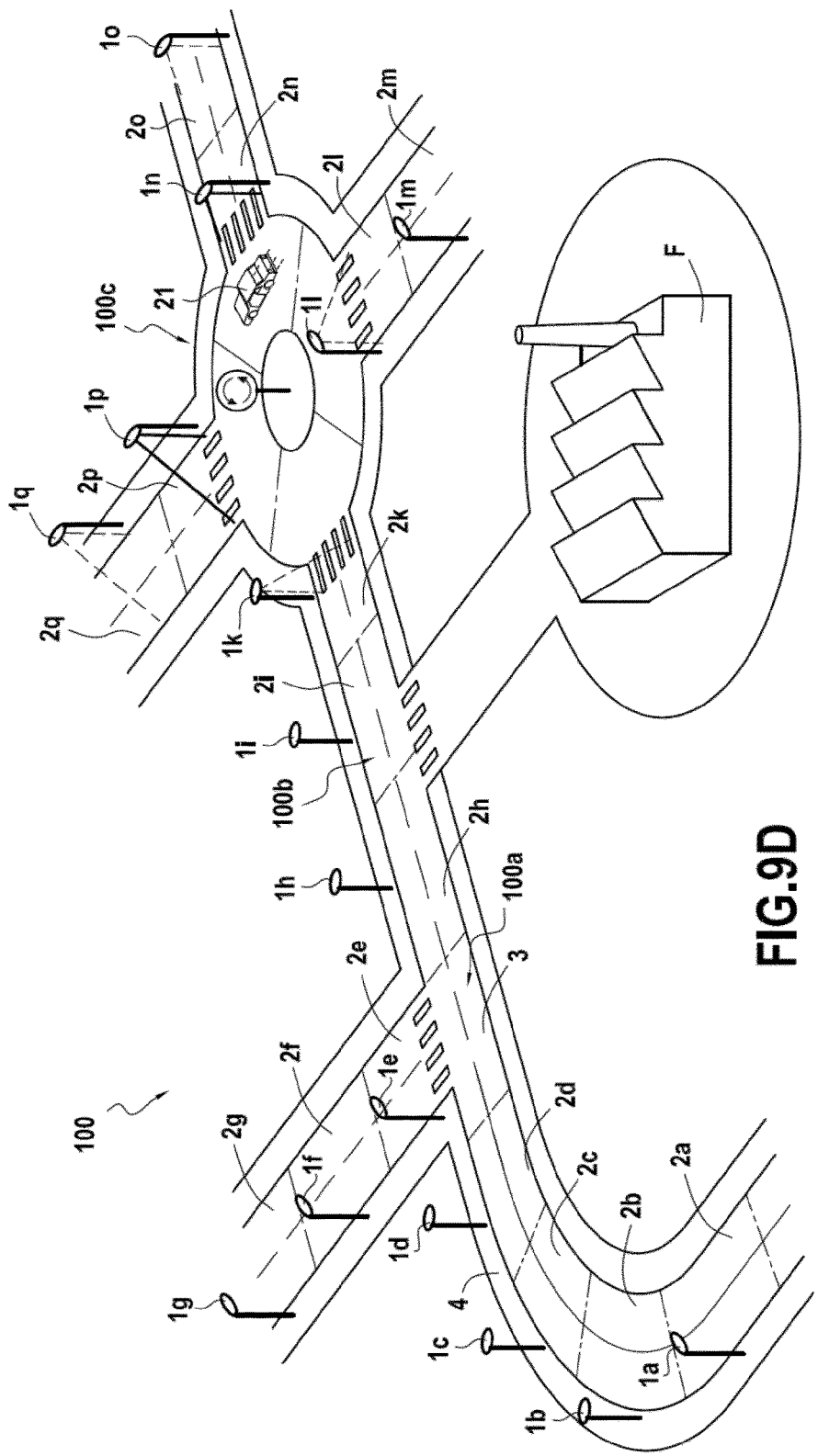

As the motor vehicle 21 drives round the roundabout 100c, past the first and second exits, to road segment 2n, as illustrated on FIG. 9D, the streetlights behind it, including those of the exits that it did not take, are successively turned off, while the oncoming streetlights, including those of the immediate exits in front of the motor vehicle 21, are turned on.

Figure 9E:
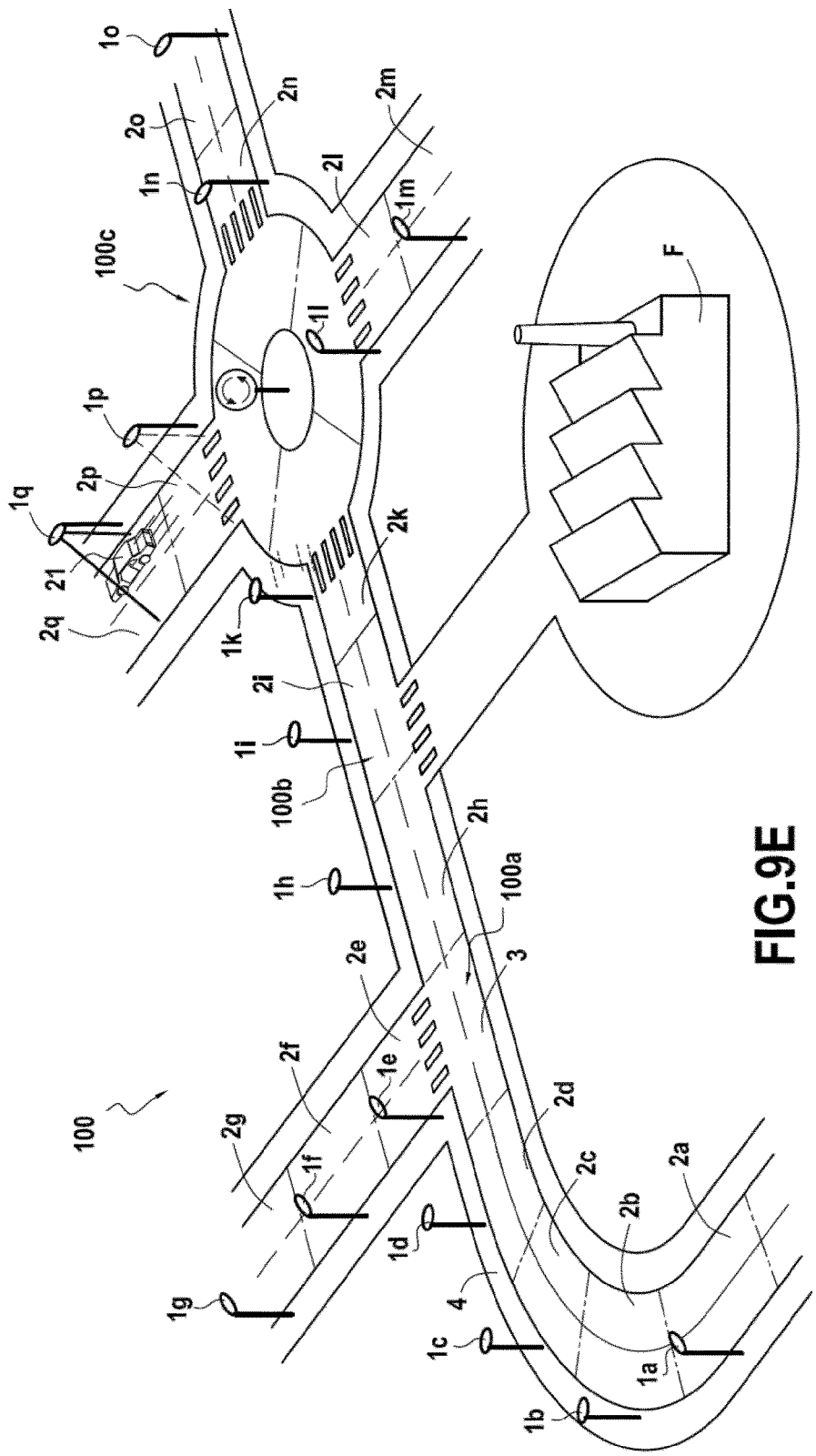

Finally, when the motor vehicle 21 takes the third exit, driving through road segment 1q, as illustrated on FIG. 9E, the streetlights in the roundabout 100c are successively turned off and those on the road in front of the motor vehicle 21 turned on.

Figure 10:
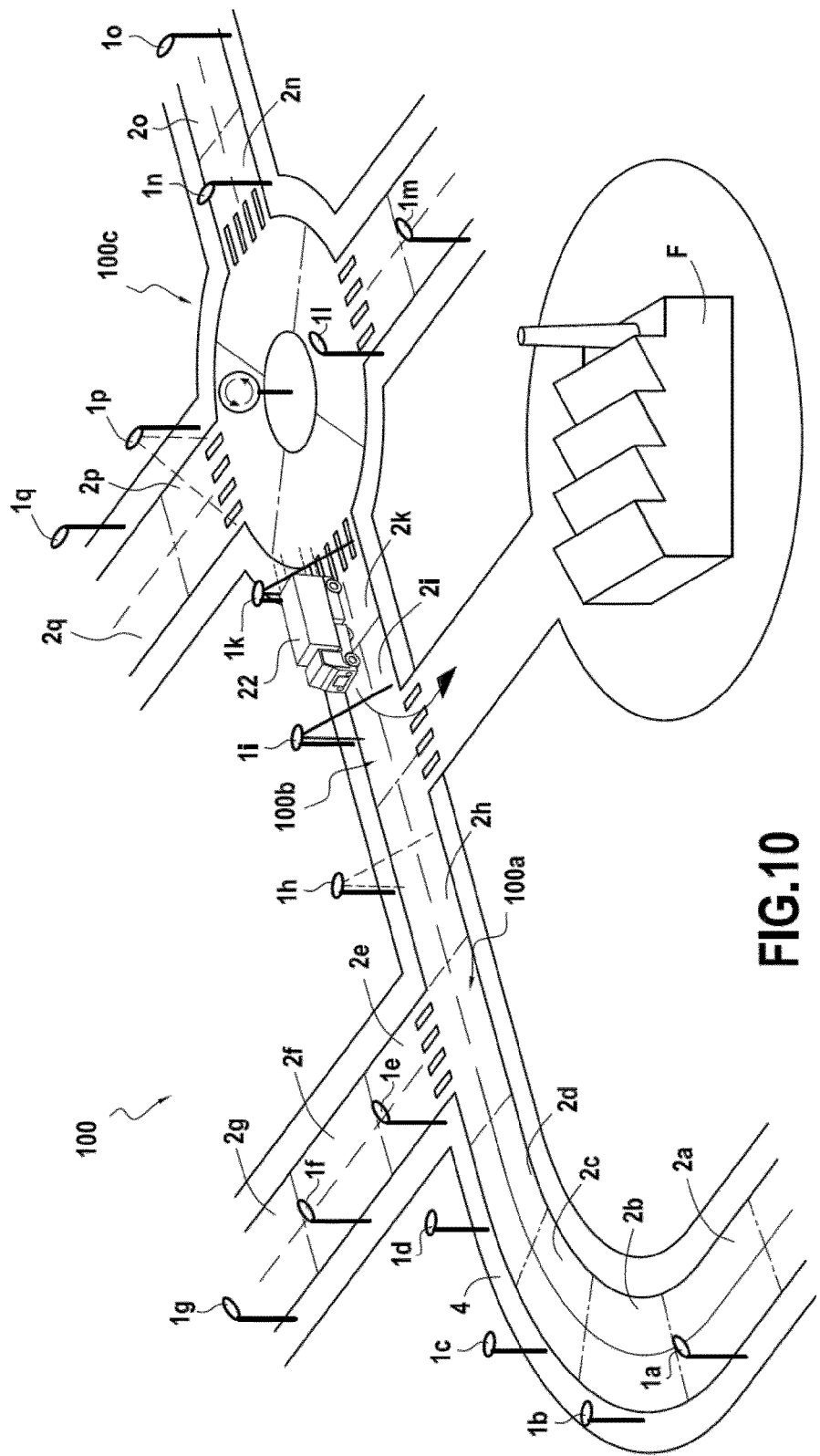
FIG. 10 illustrates the road network of FIG. 1 in a second traffic situation.

FIG. 10 illustrates a second case in which a single road user, a heavy motor vehicle 22, travels through the road network 100 of FIG. 1 along a frequently-travelled route. In this case, this heavy motor vehicle 22, namely a truck, travels from the roundabout 100c, through road segment 2k, and turns at road crossing 100b towards the factory F to its left. At this time of the day, this particular route is frequently travelled, resulting in the road segments 2k and 2i being assigned a road class corresponding to a higher maximum lighting level $P_{max}$ than the neighbouring road segments. Consequently, even though streetlight 1h may also be turned on at its own maximum lighting level $P_{max}$ as the motor vehicle 22 approaches the bifurcation at road segment 2i, this maximum lighting level $P_{max}$ of road segment 2h will be lower than those of road segments 2k and 2i, reflecting the fact that it is assigned a lower-priority road class, as the heavy motor vehicle 22 is expected to follow the currently most frequently travelled route and turn left at the bifurcation, rather than drive on straight.

Figure 11A:
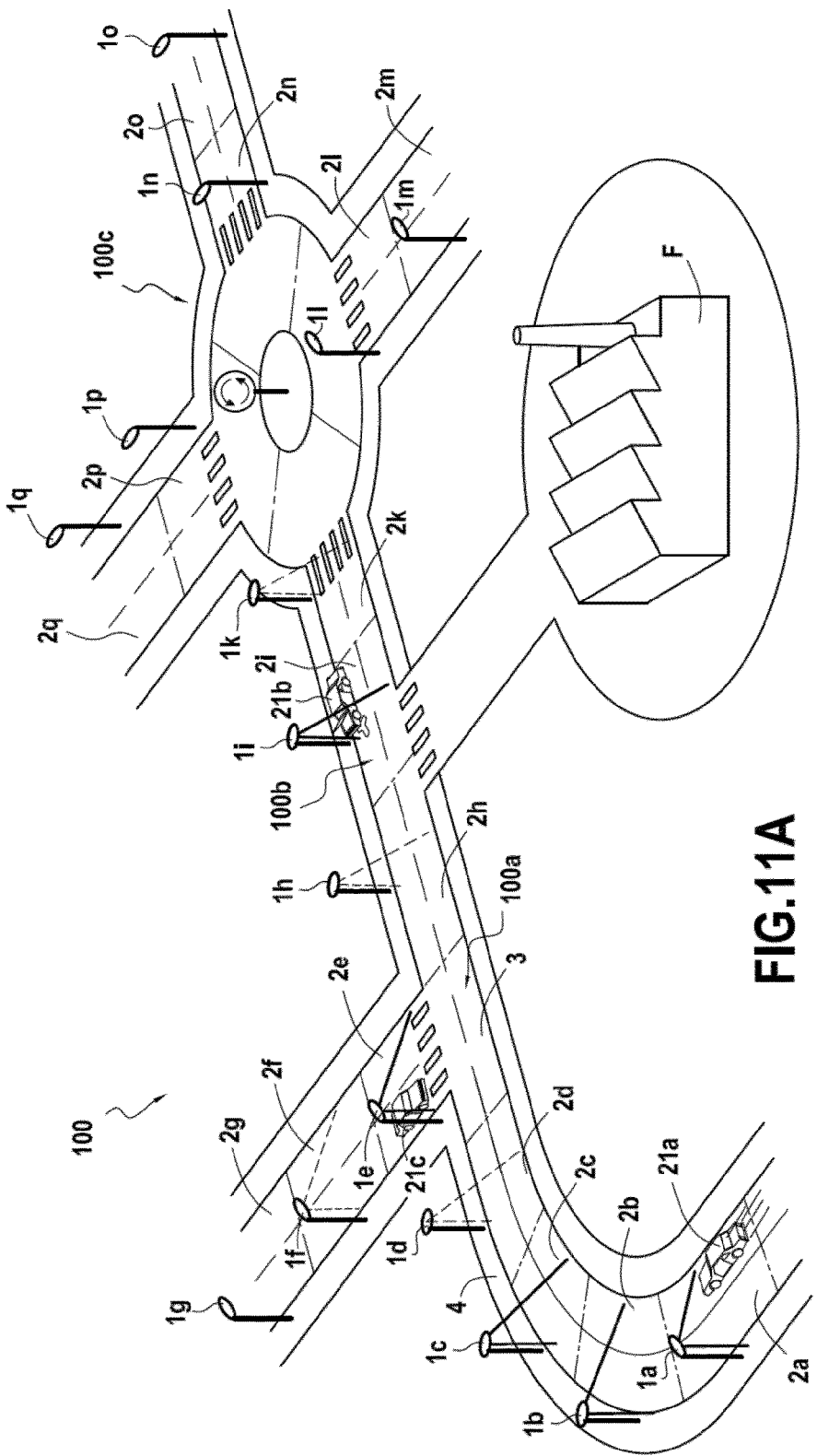
FIGS. 11A-11D illustrate the road network of FIG. 1 in a third traffic situation.

FIGS. 11A to 11D illustrate a third case with three different road users, motor vehicles 21a, 21b and 21c in the road network 100 of FIG. 1. As illustrated in FIG. 11A, the first motor vehicle 21a is driving through road segment 2a in the direction of road segment 2b. Simultaneously, the second road vehicle 21b is stationary at road segment 2i, for example because of a mechanical breakdown, while the third road vehicle 21c is also stationary, at road segment 2e, waiting for the first road vehicle 21a, which has right of way, to drive past. The streetlights 1b, 1c and 1d light up in front of the first motor vehicle 21a, as in the case illustrated in FIG. 9A. At the same time, streetlights around the second and third motor vehicles 21b and 21c are also on. However, since these second and third motor vehicles 21b and 21c are stationary, fewer road segments around them, and in particular in front of them, are illuminated. In the illustrated case, only road segment 2i is illuminated at its assigned maximum lighting level $P_{max}$ for the second road vehicle 21b, while the adjacent road segments 2h and 2k are illuminated at lighting levels lower than their assigned maximum lighting levels $P_{max}$. Around the third vehicle 21c, only road segment 2e is illuminated at its assigned maximum lighting level $P_{max}$, while the adjacent road segments 2d, 2f and 2h are illuminated at lower lighting levels.

Figure 11B:
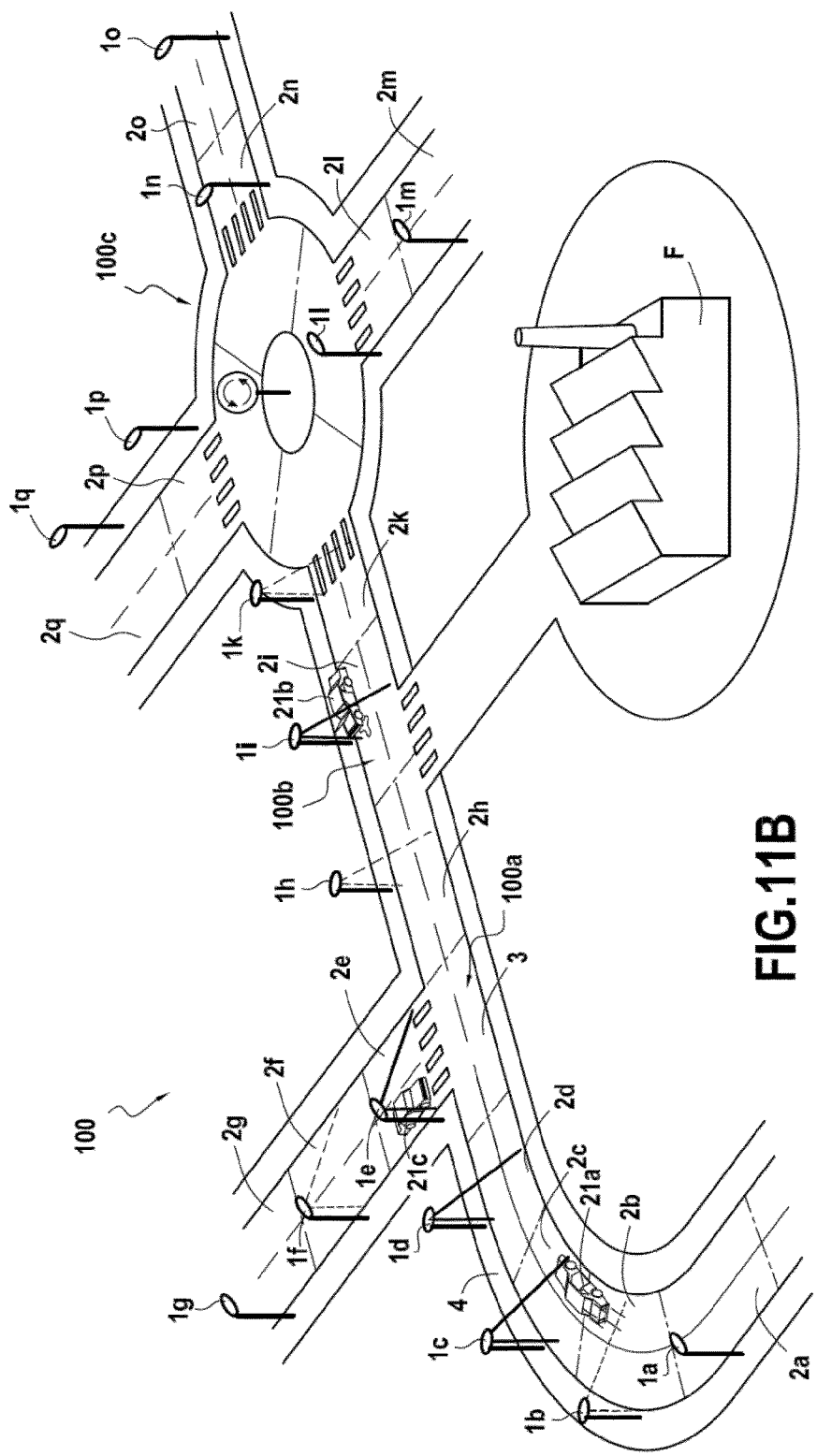

As seen in FIG. 11B, as the motor vehicle 21a progresses through the road segments 2b and 2c, and is detected by the sensor units of the corresponding streetlights 1b and 1c, streetlights in front of which were initially turned on at lower lighting levels than their assigned maximum lighting level $P_{max}$ are progressively powered up to that maximum lighting level $P_{max}$ as the motor vehicle 21a approaches. Streetlight 1d receives signals indicating both the nearby presence of the stationary third motor vehicle 21c, and the rapid approach of the first motor vehicle 21a. It will respond by adopting the highest of the lighting levels which would correspond to these two road users. So, it will remain at the same lighting level as in FIG. 11A, until the first motor vehicle 21a comes so close that it requires a higher lighting level. Thus, in the situation illustrated in FIG. 11B, the lighting level at road segment 1d has increased to its assigned maximum lighting level $P_{max}$, since the first motor vehicle 21a is already within abovementioned second distance $d_2$ from this road segment 1d. The situation around the second motor vehicle 21b remains unchanged.

Figure 11C:
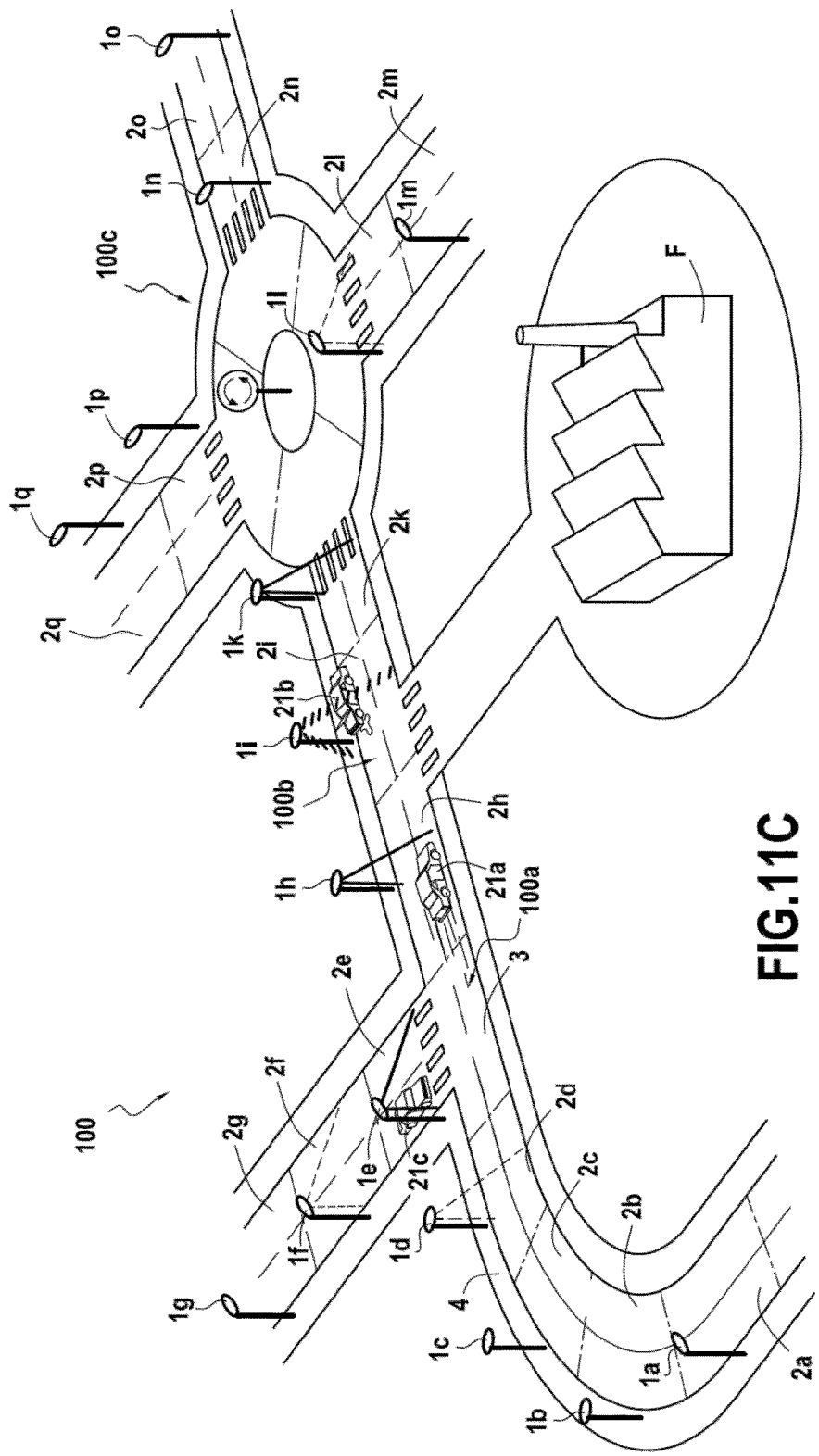

In FIG. 11C, the first motor vehicle 21a has driven past the third motor vehicle 21c and approaches the second motor vehicle 21b, immobilized on road segment 2i. Each streetlight may be equipped with a manual input, allowing stranded road users, such as the driver of said second motor vehicle 21b, to indicate such an emergency. In such a case, as the first motor vehicle 21a comes within a given range, for instance, any one of said distances $d_1$ or $d_2$, from the road segment 2i on which the second motor vehicle 21b is stranded, the corresponding streetlight ii may indicate the presence of such a road hazard by, for example, blinking or changing light colour.

Figure 11D:
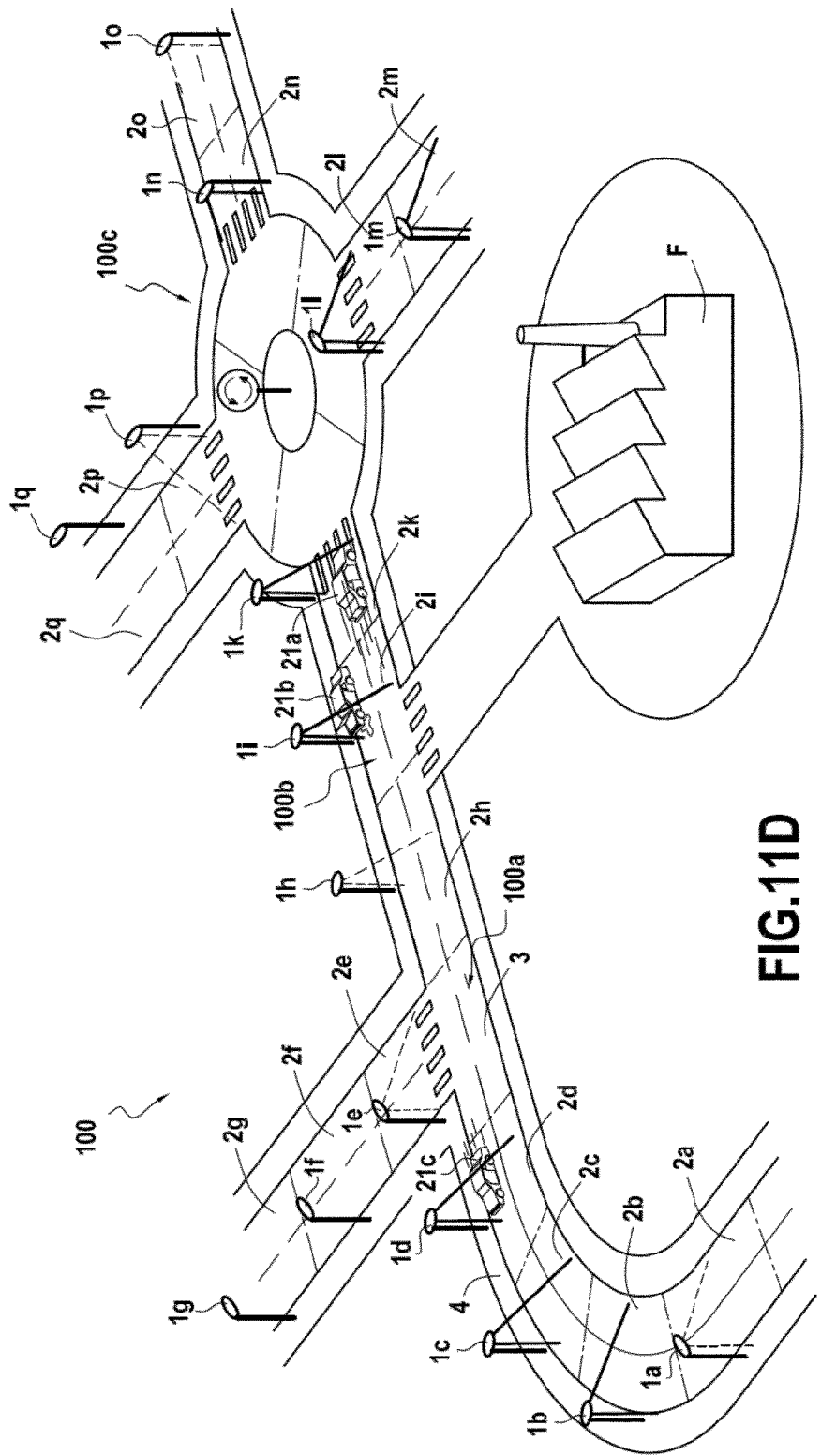

Finally, in FIG. 11D, the first motor vehicle 21a has also left the second motor vehicle 21b behind it. Streetlight ii has consequently reverted to its initial status, illuminating road segment 2i at the maximum lighting level $P_{max}$ associated to its assigned road class as long as the second motor vehicle 21b remains stranded on it. Simultaneously, the third motor vehicle 21c has finally started moving and turned right. Consequently, the illuminated area around this third motor vehicle 21c, and in particular in its direction of travel, has expanded as the speed of this third motor vehicle has increased, leading to a corresponding increase of the distances $d_1$ and $d_2$ associated with this third motor vehicle 21c, in particular in its direction of travel.

Figure 12A:
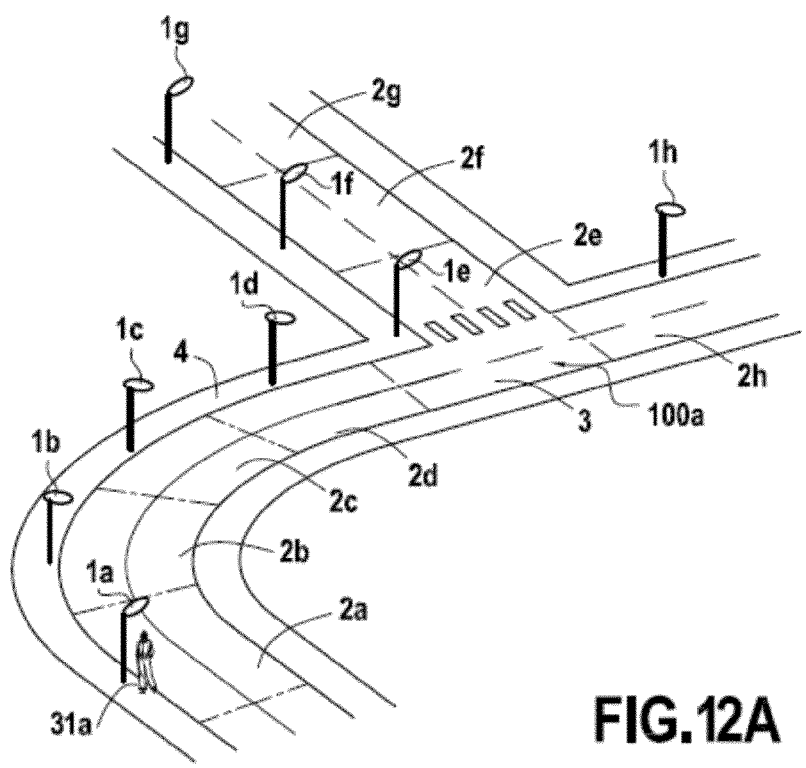
FIGS. 12A-12B illustrate the road network of FIG. 1 in a fourth traffic situation.
Figure 12B:
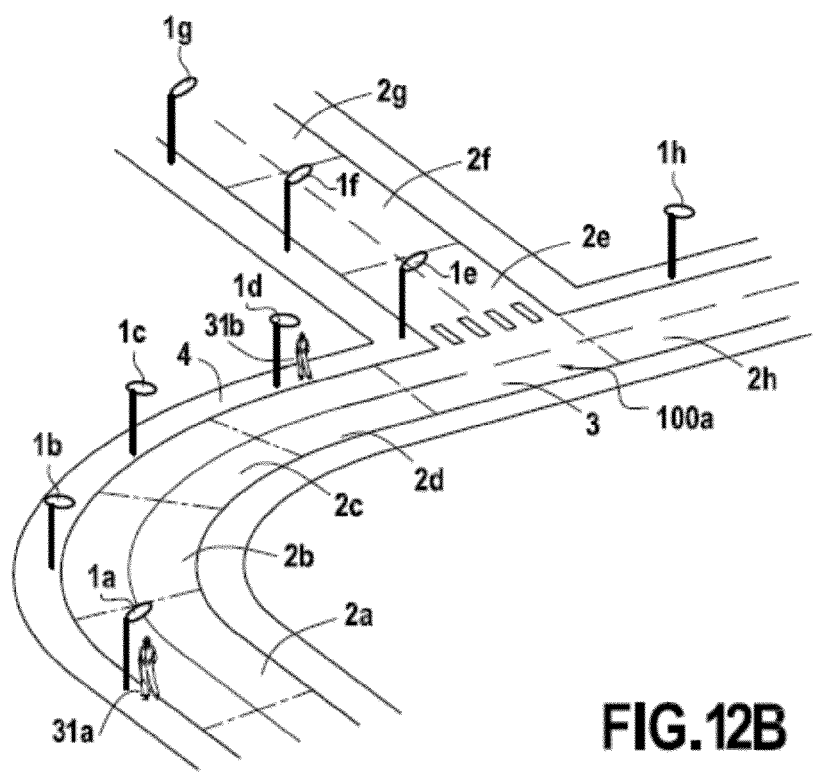

FIGS. 12A and 12B illustrate a fourth case with respectively a first and a second pedestrian user, 31a and 31b, respectively below streetlight 1a and 1d in the road network 100 of FIG. 1. Two consecutive streetlights are separated by a distance of 30 m. The streetlights contain the lighting unit 5, the sensor 7 of FIG. 2 and the control device 6 of FIG. 3. The sensor unit 7 includes a PIR sensor and a Doppler effect sensor. The streetlights are initially at the minimum lighting level, in this example 11.3 W, in order to consume the lowest amount of energy.

As illustrated in FIG. 12A, the first pedestrian 31a is walking through road segment 2a in the direction of road segment 2b. Its presence, more particularly its infrared emission, is detected by the PIR sensor unit of streetlight 1a. The control device 6 of streetlight 1a detects a change in wave frequency obtained with the Doppler effect sensor and deduces the speed of the user, as well as its direction. Signals from both sensors are then transmitted to the data processing unit 8 of streetlight 1a through the data input channel 8a.

On the basis of the incoming information from the sensor unit, the data processing unit retrieves information from its data storage unit 15, in particular the velocity dependent parameters $\alpha$, $p_1$ and $P_2$. In this case, the measured speed is 5 km/h, $\alpha$ is 1, $p_1$=90 m and $P_2$=175 m according to Table 1. The data processing unit further retrieves from the data storage the mean traffic density that has been observed on segment 2a for the past 5 minutes. With information of speed and traffic density, it selects a road class among Table 2, here the class ME4, and a corresponding $P_{max}$ of 46 W. The control device 6 commands the lighting unit 5 via the control output channel 8d and sets the required level at 46 W.

The data is processed to the transceiver 9 via the data output channel 8c. The transceiver then transmits the information (speed and direction of the user together with an identification data of the road segment 2a) to the control device 6 of neighbouring streetlight 1b.

The transceiver 9 of streetlight 1b receives information from streetlight 1a about the road user present in corresponding road segment 2a. The information is processed to the data processing unit 8 through the data input channel 8b.

The data processing unit has received no information yet from its sensor which means no user is present in corresponding road segment 2b at the moment. As described previously, the data processing unit retrieves information from its data storage and evaluates if the distance to road segment 2a is lower than distance $d_1$. As 30m is lower than 90 m, streetlight 1b sets its new lighting level to $P_{max}$ which is in this case 46 W.

Streetlight 1b also transmits the message to the control device of streetlight 1c. Streetlight 1c is still within distance $d_1$, and thus also illuminates the road at level $P_{max}$, and transmits the message to streetlight 1d. However, streetlight 1d is 92 m far from the user, which is higher that $d_1$ but lower that $d_2$ according to Table 1. Streetlight 1d will thus illuminate the road with a level $P_{new}$ calculated as follows:

$$P_{new} = P_{max} - (d-d_1)(P_{max}-P_{min})/(d_2-d_1)$$

where d is the distance between the pedestrian and the streetlight 1d. In this example, $P_{new}$ is 45.2 W. Finally, streetlight 1h receives the message, but is beyond distance $d_2$ of 175 m in this example, and thus continues to apply $P_{min}$, here 11.3 W, and doesn't transmit any message.

If the road user continues to walk and goes under streetlight 1b, the same scenario will repeat: each streetlight will compare its distance to the pedestrian with $d_1$ and $d_2$, calculate a $P_{new}$ as explained before, and will transmit the message, if needed. Streetlight 1a will then be behind the user and will continue to illuminate at $P_{max}$ as long as it is within a distance $d_1$.

FIG. 12B illustrates the case of a second pedestrian, 31b, and coming under streetlight 1d. Pedestrian 31a is on road segment 2a, below streetlight 1a. Using the same scheme as previously, streetlights 1c, 1b, le, if, 1g and 1h illuminate at $P_{max}$. In this case of multiple users, some streetlights receive contradictory information. For example 1d and 1a receive contradictory information: for pedestrian 31b, streetlight 1a should illuminate at $P_{new}$, but at $P_{max}$ for pedestrian 31a; while streetlight 1d should illuminate at $P_{new}$ for pedestrian 31a and $P_{max}$ for pedestrian 31b. In order to always give the right amount of illumination in accordance with the road class of each user, the two streetlights 1a and 1d select the maximum level of all their known users, thus in this case selecting $P_{max}$.

Those skilled in the art will recognize that the present invention may be manifested in a variety of forms other than the specific embodiments described and contemplated herein. Accordingly, departure in form and detail may be made without departing from the scope of the present invention as described in the appended claims.

The invention claimed is:

1. A method for controlling street lighting over a plurality of interconnected road segments, comprising the steps of:
   detecting speed and direction of travel of a road user on a road segment;
   propagating a signal comprising speed and direction of travel data of the road user, and an identification of the road user's road segment, through a series of adjacent road segments starting from the road user's road segment;
   dynamically assigning a road class and a corresponding maximum lighting level to each road segment, said road class representing photometric requirements based on visual needs of the road user in the road segment and said road class been selected on the basis of at least stored road type data associated to each road segment, and traffic parameters determined for each road segment for a current time period, said road type data comprising at least geometrical characteristics of road segment and an allowed speed limit, setting a new lighting level equal to said maximum lighting level at each road segment whose distance to the road user is not greater than a first distance; and comparing, for each road segment, said new lighting level with a current lighting level, and changing the current lighting level to the new lighting level if they are different;

wherein said distance is calculated on the basis of said speed and direction of travel of the road user;

wherein said traffic parameters relate at least to speed and density of road users on that road segment over said current time period;

wherein the method further comprises a step of selecting a subset of eligible road classes for each road segment, on the basis of road user information contained in said signal, before dynamically assigning to each road segment a road class selected from said subset at least on the basis of stored road type data associated to each road segment and traffic parameters determined for each road segment for a current time period;

wherein, beyond said first distance from the road user, each road segment is set a new lighting level which gradually decreases towards a predetermined minimum lighting level at a second distance greater than said first distance;

wherein, upon concurrent reception of a plurality of said signals at a road segment, a new lighting level is set for each signal wherein the distance to the road user's road segment is not greater than said second distance, the current lighting level for this road segment being compared with the highest new lighting level and changed to this highest new lighting level if the highest new lighting level is different from the current lighting level; and wherein the above steps are repeated every few milliseconds.

2. The method according to claim 1, wherein said first distance is greater by an asymmetry factor in the direction of travel of the road user than in a different direction.

3. The method of claim 2, wherein said asymmetry factor is calculated on the basis of said speed of the road user.

4. The method according to claim 1, further comprising a step of determining an environmental parameter, such as an ambient light level, and wherein the current lighting level is maintained at a predetermined minimum lighting level unless said environmental parameter fulfills a predetermined condition.

5. A non-transitory computer-readable medium for controlling street lighting over a plurality of interconnected road segments, comprising instructions stored thereon, that when executed on a processor, perform the steps of the method according to claim 1.

6. A device for controlling street lighting on a road segment, wherein said device comprises a data processing unit with:

data storage for storing road type data of said road segment, said road type data comprising geometrical characteristics of the road and an allowed speed limit;

a first data input channel for receiving a signal comprising speed and direction of travel data of a road user on said road segment;

a second data input channel for receiving, from an adjacent road segment, a signal comprising speed and direction of travel data of a road user on said adjacent road segment or on another road segment connected to the control device's road segment over said adjacent road segment, and identification data of the road user's road segment;

a data output channel for transmitting, to an adjacent road segment, a signal comprising road user speed and direction of travel data received over said first and/or second data input channels, and identification data of the road user's road segment; and a control output channel for outputting a lighting command signal to a lighting unit;

said data processing unit being configured to:

dynamically assign a road class representing photometric requirements based on visual needs of the road user in the road segment, to the control device's road segment on the basis of, at least, said road type data and traffic parameters determined for this road segment for a current time period, said road class being associated with a corresponding maximum lighting level;

set a new lighting level equal to said maximum lighting level for the assigned road class upon reception of road user speed and direction of travel data over said first and/or second data input channels if a distance to the road user is not greater than a first distance calculated on the basis of a speed and direction of travel of the road user; and compare said new lighting level with a current lighting level of the lighting command signal, and change the current lighting level to the new lighting level if they are different;

wherein the following steps are repeated every few milliseconds:

detecting speed and direction of travel of a road user on a road segment;

propagating a signal comprising speed and direction of travel data of the road user, and an identification of the road user's road segment, through a series of adjacent road segments starting from the road users road segment;

dynamically assigning a road class and a corresponding maximum lighting level to each road segment said road class representing photometric requirements based on visual needs of the road user in the road segment and said road class been selected on the basis of at least stored road type data associated to each road segment, and traffic parameters determined for each road segment for a current time period, said road type data comprising at least geometrical characteristics of road segment and an allowed speed limit, setting a new lighting level equal to said maximum lighting level at each road segment whose distance to the road user is not grater than a first distance; and comparing, for each road segment, said new lighting level with a current lighting level, and changing the current lighting level to the new lighting level if they are different.

7. A control device according to claim 6, wherein the data processing unit is also configured to modify said lighting command signal in response to an incoming emergency signal.

8. A system for controlling street lighting on a plurality of interconnected road segments, said control system comprising a control device according to claim 6 for each of said interconnected road segments, each one of the control devices being connected to at least another one of the control devices, which corresponds to an adjacent road segment, for the transmission of road user speed, direction of travel and road segment identification data between the control devices.

9. A street lighting system comprising a sensor set for detecting speed and direction of travel of road users on a plurality of interconnected road segments and, for each of said interconnected road segments, a lighting unit and a control device according to claim 6 connected thereto, each one of the control devices being also connected to said sensor set and to at least another one of the control devices, which corresponds to an adjacent road segment, for the transmission of road user speed, direction of travel and road segment identification data between the control devices.

10. The street lighting system according to claim 8, wherein said sensor set comprises at least one sensor unit individually connected to one of the control devices, for detecting at least speed and direction of travel of a road user on that control device's road segment.

\* \* \* \* \*